(12) United States Patent
Tsutsui

(10) Patent No.: US 10,880,768 B2
(45) Date of Patent: Dec. 29, 2020

(54) APPARATUS, METHOD, AND SYSTEM RELATING TO MINIMIZATION OF DRIVE TESTS (MDT) MEASUREMENTS

(71) Applicant: NEC CORPORATION, Tokyo (JP)

(72) Inventor: Takahiro Tsutsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 15/752,028

(22) PCT Filed: Aug. 22, 2016

(86) PCT No.: PCT/JP2016/074377
§ 371 (c)(1),
(2) Date: Feb. 12, 2018

(87) PCT Pub. No.: WO2017/043296
PCT Pub. Date: Mar. 16, 2017

(65) Prior Publication Data
US 2018/0242181 A1    Aug. 23, 2018

(30) Foreign Application Priority Data

Sep. 11, 2015   (JP) ................................. 2015-179904

(51) Int. Cl.
*H04W 4/00* (2018.01)
*H04W 24/10* (2009.01)
(Continued)

(52) U.S. Cl.
CPC ........... *H04W 24/10* (2013.01); *H04W 16/18* (2013.01); *H04W 36/0061* (2013.01);
(Continued)

(58) Field of Classification Search
None
See application file for complete search history.

(56) References Cited

U.S. PATENT DOCUMENTS 8,849,346 B2 * 9/2014 Jorguseski ............ H04W 24/02
455/436
9,544,857 B2 * 1/2017 Carter .................. H04W 52/143
(Continued)

FOREIGN PATENT DOCUMENTS

JP    2012-227667 A    11/2012
WO   2014/188928 A1   11/2014

OTHER PUBLICATIONS

Written Opinion dated Oct. 25, 2016 issued by the International Searching Authority in PCT/JP2016/074377.
(Continued)

*Primary Examiner* — Kwang B Yao
*Assistant Examiner* — Juvena W Loo
(74) *Attorney, Agent, or Firm* — Sughrue Mion, PLLC

(57) ABSTRACT

To enable more efficient collection of information for optimal area design of a downlink only cell. An apparatus of the present invention includes: an information acquisition unit configured to acquire target cell information indicating a target cell of minimization of drive tests (MDT) measurements in an idle mode of a terminal apparatus; and a communication processing unit configured to transmit the target cell information to the terminal apparatus. The target cell includes a downlink only cell.

20 Claims, 8 Drawing Sheets

(51) Int. Cl.
*H04W 16/18* (2009.01)
*H04W 36/00* (2009.01)
H04W 48/20 (2009.01)
H04W 84/04 (2009.01)
H04W 72/04 (2009.01)

(52) U.S. Cl.
CPC .......... *H04W 48/20* (2013.01); *H04W 72/042* (2013.01); *H04W 84/045* (2013.01)

(56) References Cited

U.S. PATENT DOCUMENTS

| | | | |
|---|---|---|---|
| 2010/0056170 A1* | 3/2010 | Lindoff | H04L 1/0026 455/452.1 |
| 2011/0183661 A1 | 7/2011 | Yi et al. | |
| 2012/0314675 A1* | 12/2012 | Vujcic | H04L 5/0091 370/329 |
| 2013/0053091 A1* | 2/2013 | Jorguseski | H04W 24/02 455/524 |
| 2013/0229931 A1* | 9/2013 | Kim | H04W 24/10 370/252 |
| 2014/0044002 A1 | 2/2014 | Fujishiro | |
| 2014/0064247 A1* | 3/2014 | Teyeb | H04W 36/0083 370/331 |
| 2014/0128057 A1* | 5/2014 | Siomina | H04J 3/0685 455/423 |
| 2014/0301360 A1* | 10/2014 | Bontu | H04W 36/0083 370/331 |
| 2014/0357297 A1 | 12/2014 | Futaki | |
| 2015/0098425 A1* | 4/2015 | Bergljung | H04L 5/001 370/329 |
| 2015/0230112 A1 | 8/2015 | Siomina et al. | |
| 2016/0100378 A1 | 4/2016 | Chang et al. | |
| 2016/0192339 A1* | 6/2016 | Axmon | H04W 24/10 370/329 |

OTHER PUBLICATIONS

3GPP TS 36.300 V12.5.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", Mar. 2015, pp. 1-251.

3GPP TS 36.101 V12.7.0, "3rd Generation Partnership Project; Technical Specification Group Radio Access Network; Evolved Universal Terrestrial Radio Access (E-UTRA); User Equipment (UE) radio transmission and reception (Release 12)", Mar. 2015, pp. 1-659.

3GPP TS 37.320 V12.2.0, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)", Sep. 2014, pp. 1-25.

3GPP TS 36.331 V12.5.0, "3rd Generation Partnership Project; Technical Specification Group Radio Access Network; Evolved Universal Terrestrial Radio Access (E-UTRA); Radio Resource Control (RRC); Protocol specification (Release 12)", Mar. 2015, pp. 1-445.

Huawei, Hisilicon, "CHIBA issue", 3GPP TSG-RAN WG2 Meeting #85bis, R2-141551, Mar. 31-Apr. 4, 2014, pp. 1-8, Valencia, Spain.

NEC, "Remaining aspects of possible new TDD configurations", 3GPP TSG RAN Meeting #69, RP-151352, Sep. 14-16, 2015, pp. 1-3, Phoenix, USA.

International Search Report of PCT/JP2016/074377 dated Oct. 25, 2016 [PCT/ISA/210].

* cited by examiner

APPARATUS, METHOD, AND SYSTEM RELATING TO MINIMIZATION OF DRIVE TESTS (MDT) MEASUREMENTS

CROSS REFERENCE TO RELATED APPLICATIONS

This application is a National Stage of International Application No. PCT/JP2016/074377, filed Aug. 22, 2016, claiming priority based on Japanese Patent Application No. 2015-179904, filed Sep. 11, 2015.

BACKGROUND

Technical Field

The present invention relates to an apparatus, a method, and a system relating to minimization of drive tests (MDT) measurements.

Background Art

There is a technique using aggregated multiple cells with the purpose of improving throughput of a user plane (U-plane) of user equipment (UE). This technique is called carrier aggregation (CA) and is disclosed in Non-Patent Literature 1 (NPL1).

In the recent years, there are more services targeting downlink (DL), which has led to a stronger desire for improvement in throughput of DL than in throughput of uplink (UL). In association with this, Band 29 and Band 32 are defined as downlink-dedicated bands in Non-Patent Literature 2 (NPL2). When UE is in a connected mode (or connected state), the cells in the downlink-dedicated bands are used as secondary cells but are not used as primary cells. In addition, the cells in the downlink-dedicated bands are DL only cells and are not the targets of cell selection or cell reselection performed when the UE is in an idle mode (or idle state).

Moreover, the MDT functionality is standardized in the LTE-Advanced of the Third Generation Partnership Project (3GPP). The MDT functionality is functionality of substituting drive tests with the purpose of reducing operation expenditure (OPEX). In MDT, coverage problems are detected by collecting, on the network side, information acquired from measurements by UE. This is disclosed in Non-Patent Literature 3 (NPL3). There are two techniques, Logged MDT and Immediate MDT, as techniques for measurements and collection relating to MDT. Logged MDT is a technique for causing UE in an idle mode to perform measurements and to report results of the measurements at the time of the UE entering a connected state. Immediate MDT is a technique for causing UE in a connected mode to perform measurements and to report results of the measurements. Note that radio resource control (RRC) procedures for these measurements are disclosed in Non-Patent Literature 4 (NPL4).

CITATION LIST

Non-Patent Literature

[NPL1] 3GPP TS 36.300 V12.5.0 (2015-03) 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)

[NPL2] 3GPP TS 36.101 V12.7.0 (2015-03) 3rd Generation Partnership Project; Technical Specification Group Radio Access Network; Evolved Universal Terrestrial Radio Access (E-UTRA); User Equipment (UE) radio transmission and reception (Release 12)

[NPL3] 3GPP TS 37.320 V12.2.0 (2014-09) 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 12)

[NPL4] 3GPP TS 36.331 V12.5.0 (2015-03) 3rd Generation Partnership Project; Technical Specification Group Radio Access Network; Evolved Universal Terrestrial Radio Access (E-UTRA); Radio Resource Control (RRC); Protocol Specification (Release 12)

SUMMARY

Technical Problem

As described above, each cell in the downlink-dedicated bands (e.g., Bands 29 and 32) defined in NPL2 is a DL only cell and is used as a secondary cell. Specifically, for example, a DL only cell is arranged in the coverage area of a cell used as a primary cell and is used as a secondary cell together with the primary cell. The primary cell and the secondary cell(s) (i.e., DL only cells) are cells of the same evolved NodeB (eNB).

The coverage of each secondary cell may extend to an area that is outside the coverage of the primary cell and is in a coverage of another cell (cell of another eNB). This area in the coverage of the secondary cell is an unavailable coverage, which is an unnecessary coverage. Such an unavailable coverage (or unnecessary coverage) may be a factor of interference with other cells. For optimal area design, it is desirable that information on such an unavailable coverage be collected using MDT.

However, it is difficult to collect information on the unavailable coverage through Logged MDT. This is because, in Logged MDT measurements, only measurements for cells that are targets of cell selection and cell reselection are performed, and cells used only as secondary cells (DL only cells) are not targets of measurements. Consequently, information on an unavailable coverage may be collected only by UE in the connected mode without being collected by UE in the idle mode.

An example object of the present invention is to enable more efficient collection of information for optimal area design of a DL only cell.

Solution to Problem

A first apparatus according to an example aspect of the present invention includes: an information acquisition unit configured to acquire target cell information indicating a target cell of minimization of drive tests (MDT) measurements in an idle mode of a terminal apparatus; and a communication processing unit configured to transmit the target cell information to the terminal apparatus. The target cell includes a downlink only cell.

A second apparatus according to an example aspect of the present invention includes: an information acquisition unit configured to acquire target cell information indicating a target cell of MDT measurements in an idle mode of a terminal apparatus, the target cell information being transmitted by a base station; and a measurement unit configured to perform the MDT measurements based on the target cell information. The target cell includes a downlink only cell.

A third apparatus according to an example aspect of the present invention includes: an information acquisition unit configured to acquire target cell information indicating a target cell of MDT measurements in an idle mode of a terminal apparatus; and a communication processing unit configured to transmit the target cell information to a base station. The target cell includes a downlink only cell.

A first method according to an example aspect of the present invention includes: acquiring target cell information indicating a target cell of MDT measurements in an idle mode of a terminal apparatus; and transmitting the target cell information to the terminal apparatus. The target cell includes a downlink only cell.

A second method according to an example aspect of the present invention includes: acquiring target cell information indicating a target cell of MDT measurements in an idle mode of a terminal apparatus, the target cell information being transmitted by a base station; and performing the MDT measurements based on the target cell information. The target cell includes a downlink only cell.

A third method according to an example aspect of the present invention includes: acquiring target cell information indicating a target cell of MDT measurements in an idle mode of a terminal apparatus; and transmitting the target cell information to a base station. The target cell includes a downlink only cell.

A system according to an example aspect of the present invention includes: a base station configured to transmit, to a terminal apparatus, target cell information indicating a target cell of MDT measurements in an idle mode of the terminal apparatus; and the terminal apparatus configured to perform the MDT measurements based on the target cell information. The target cell includes a downlink only cell.

A fourth method according to an example aspect of the present invention includes: transmitting, by a base station to a terminal apparatus, target cell information indicating a target cell of MDT measurements in an idle mode of the terminal apparatus; and performing, by the terminal apparatus, the MDT measurements based on the target cell information. The target cell includes a downlink only cell.

Advantageous Effects of Invention

According to the present invention, it is possible to more efficiently collect information for optimal area design of a DL only cell. Note that the present invention may exert other advantageous effects instead of the above advantageous effects or together with the above advantageous effects.

DESCRIPTION OF THE EMBODIMENTS

Figure 1:
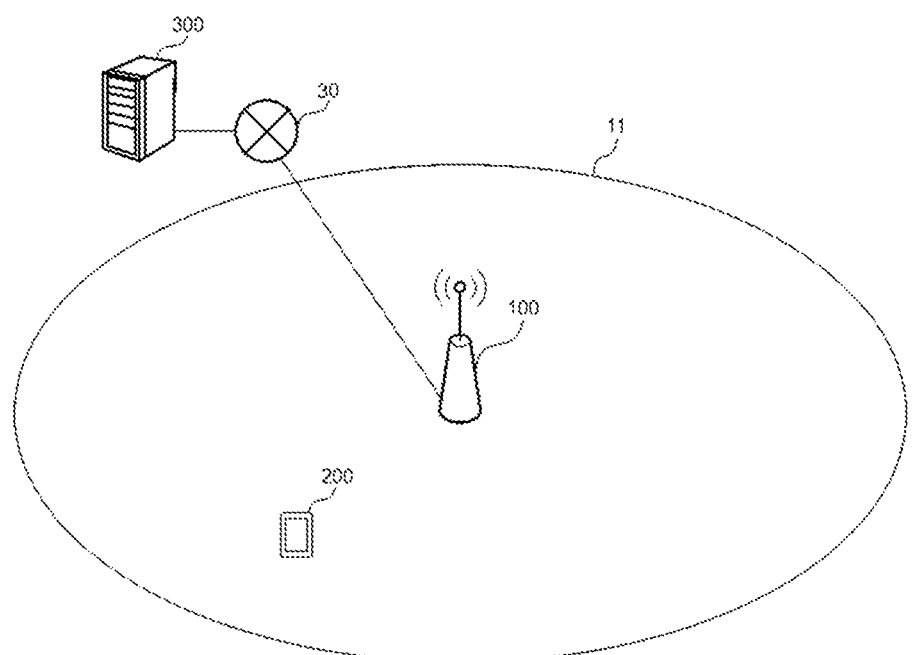
FIG. 1 is an explanatory diagram illustrating an example of a schematic configuration of a system according to exemplary embodiments of the present invention.

Details of exemplary embodiments of the present invention will be described below with reference to the accompanying drawings. Note that, in the present description and drawings, elements to which similar descriptions are applicable may be denoted by the same reference signs, whereby overlapping descriptions may be omitted.

Descriptions will be given in the following order.
1. RELATED ART
2. Overview of Exemplary Embodiments of the Present Invention
3. Example of Configuration of System
4. First Exemplary Embodiment
4.1. Example of Configuration of Base Station
4.2. Example of Configuration of Terminal Apparatus
4.3. Example of Configuration of Network Node
4.4. Technical Features
5. Second Exemplary Embodiment
5.1. Example of Configuration of Base Station
5.2. Example of Configuration of Terminal Apparatus
5.3. Technical Features 1. Related Art As a technique relating to exemplary embodiments of the present invention, carrier aggregation (CA) and minimization of drive tests (MDT) are described.
(1) Carrier Aggregation (CA)
In the LTE-Advanced of the Third Generation Partnership Project (3GPP), evolved NodeBs (eNBs) configure evolved universal terrestrial radio access network (E-UTRAN). In addition, recently, heterogeneous network (HetNet) environment is formed by various cells. For example, it is conceivable to configure a macro cell, which has a large coverage, and a small cell, which has a small coverage. The small cell may be a micro cell, a pico cell, or a femto cell, or may be a cell of another kind that is smaller than a macro cell.

There is a technique using aggregated multiple cells with the purpose of improving throughput of a user plane (U-plane) of user equipment (UE). This technique is called carrier aggregation (CA) and is disclosed in NPL 1 (3GPP TS 36.300 V12.5.0). For example, carrier aggregation is employed in environment including multiple cells having different frequencies and overlapping coverages (Het-Net environment). Note that the multiple cells are cells of the same eNB (i.e., intra-eNB cells).

Multiple cells aggregated through CA include one primary cell (PCell) used for communication in the user plane and a control plane (C-plane) and one or more secondary cells (SCells) (four secondary cells at maximum) used for communication in the user plane. Note that the larger the number of aggregated cells is, the higher the throughput may become.

In the recent years, there are more services targeting DL, which has led to a stronger desire for improvement in throughput of DL than in throughput of uplink (UL). In association with this, Band 29 and Band 32 are defined as downlink-dedicated bands in NPL 2 (3GPP TS 36.101 V12.7.0). When the UE is in a connected mode (or connected state), the cells in the downlink-dedicated bands are used as secondary cells but are not used as primary cells. In addition, the cells in the downlink-dedicated bands are not the targets of cell selection and cell reselection performed when the UE is in an idle mode (or idle state). For this reason, the UE is not able to camp on any cell in the downlink-dedicated bands.

In CA, control of handover (HO) in the connected mode is control for switching between primary cells. When the primary cell before HO (i.e., old primary cell) and the primary cell after HO (i.e., new primary cell) are cells of the same eNB (i.e., intra-eNB cells), secondary cell(s) may be usable continuously. On the other hand, when the primary cell before HO (i.e., old primary cell) and the primary cell after HO (i.e., new primary cell) are cells of different eNBs (i.e., inter-eNB cells), secondary cells are not usable continuously.

(2) Minimization of Drive Tests (MDT)

The MDT functionality is standardized in the LTE-Advanced of the 3GPP. The MDT functionality is functionality of substituting drive tests with the purpose of reducing operation expenditure (OPEX).

In MDT, information acquired as a result of measurements by UE is collected on the network side to detect coverage problems relating to coverage hole/weak coverage, pilot pollution/overshoot coverage/coverage mapping/UL coverage/cell boundary mapping/coverage mapping for pico cell in CA scenario, and the like. This is disclosed in NPL 3 (3GPP TS 37.320 V12.2.0).

Examples of techniques for measurements and collection relating to MDT include two techniques, Logged MDT and Immediate MDT.

Logged MDT is a technique for causing UE in the idle mode to perform measurements and to report results of the measurements at the time of the UE entering a connected state. The UE performs periodic measurements only in a "camped normally" state. For example, these measurements include reference signal received power (RSRP) and/or reference signal received quality (RSRQ) measurements as well as measurements of the location of the UE. For example, the location measurements use the global navigation satellite system (GNSS).

Immediate MDT is a technique for causing UE in the connected mode to perform measurements and to report results of the measurements. The UE performs periodic measurements and/or event-triggered measurements. For example, these measurements include RSRP and/or RSRQ measurements as well as measurements of the location of the UE. For example, the location measurements use the GNSS.

Note that radio resource control (RRC) procedures for these measurements are disclosed in NPL 4 (3GPP TS 36.331 V12.5.0).

2. Overview of Exemplary Embodiments of the Present Invention

An overview of exemplary embodiments of the present invention is described.

(1) Technical Problem

The cell in the downlink-dedicated band (e.g., Bands 29 and 32) is a DL only cell and is used as a secondary cell. Specifically, for example, DL only cell is arranged in the coverage area of a cell used as a primary cell and is used as a secondary cell together with the primary cell. The primary cell and the secondary cell (i.e., DL only cell) are cells of the same evolved NodeB (eNB).

The coverage of secondary cell may extend to the area that is outside the coverage of the primary cell and is in the coverage of another cell (cell of another eNB). The area in the coverage of the secondary cell is an unavailable coverage, and an unnecessary coverage. Such an unavailable coverage (or unnecessary coverage) may be a factor of interference with other cells. For optimal area design, it is desirable that information on such an unavailable coverage be collected using MDT.

However, it is difficult to collect the information on an unavailable coverage through Logged MDT. This is because, in Logged MDT measurements, only measurements for each cell that is a target of cell selection and cell reselection are performed, and each cell used only as a secondary cell (DL only cell) is not a target of measurements. Consequently, information on an unavailable coverage may be collected only by UE in the connected mode without being collected by UE in the idle mode.

(2) Technical Features

In the exemplary embodiments of the present invention, for example, the eNB transmits, to UE, target cell information indicating a target cell that is a target for Logged MDT measurements, in order to solve the above technical problem. The target cell includes a DL only cell. The UE then, for example, performs Logged MDT measurements on the DL only cell on the basis of the target cell information.

This, for example, enables UE in the idle mode to perform MDT measurements on a DL only cell. In other words, it is possible for not only UE in the connected mode but also UE in the idle mode to perform MDT measurements on a DL only cell. Hence, information for optimal area design of a DL only cell may be collected more efficiently.

3. Example of Configuration of System

Figure 2:
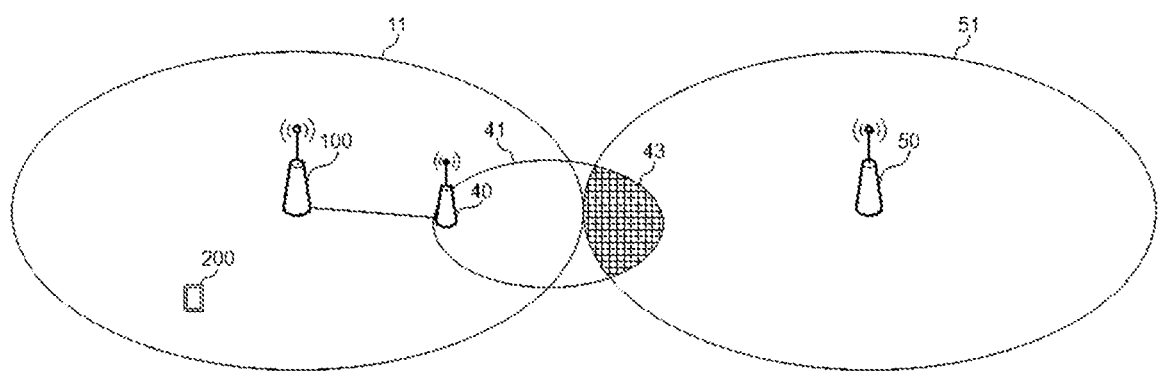
FIG. 2 is an explanatory diagram for describing an example of a first case of a cell configuration.
Figure 3:
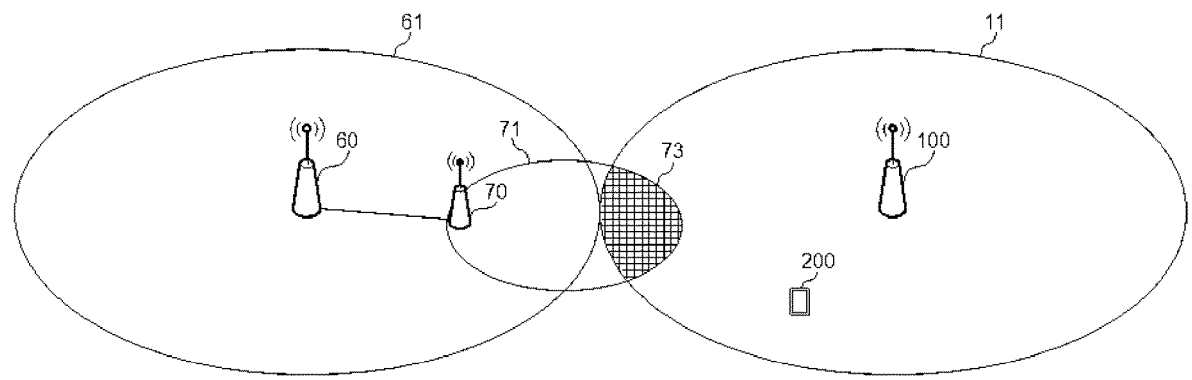
FIG. 3 is an explanatory diagram for describing an example of a second case of the cell configuration.

With reference to FIG. 1 to FIG. 3, an example of a configuration of a system 1 according to the exemplary embodiments of the present invention is described. FIG. 1 is an explanatory diagram illustrating an example of a schematic configuration of the system 1 according to the exemplary embodiments of the present invention. With reference to FIG. 1, the system 1 includes a base station 100, a terminal apparatus 200, and a network node 300. The base station 100 and the network node 300 communicate with each other through a network 30. For example, the network 30 includes a backhaul and a core network.

The system 1 may be a system conforming to the standards of the Third Generation Partnership Project (3GPP). More specifically, the system 1 may be a system conforming to the Long Term Evolution (LTE), LTE-Advanced, and/or System Architecture Evolution (SAE). The system 1 is, of course, not limited to these examples.

(1) Base Station 100

The base station 100 is a node in a radio access network (RAN) and performs radio communication with a terminal apparatus (e.g., the terminal apparatus 200) located in a coverage 11. For example, the base station 100 is an eNB.

(2) Terminal Apparatus 200

The terminal apparatus 200 performs radio communication with a base station. For example, when the terminal apparatus 200 is located in the coverage 11 of the base station 100, the terminal apparatus 200 performs radio communication with the base station 100. For example, the terminal apparatus 200 is UE.

(3) Network Node 300

The network node 300 is a core network node and performs control relating to MDT. For example, the network node 300 is a mobility management entity (MME), a trace collection entity (TCE), and/or an EM. Alternatively, the network node 300 may be another core network node.

(4) MDT

In particular, in the exemplary embodiments of the present invention, the base station 100 and the terminal apparatus 200 support MDT. For example, the base station 100 makes configuration for MDT measurements, and the terminal apparatus 200 performs MDT measurements on the basis of the configuration. The MDT measurements include MDT measurements in the idle mode and/or MDT measurements in the connected mode. For example, the MDT measurements in the idle mode are Logged MDT measurements, and the MDT measurements in the connected mode are Immediate MDT measurements. Here, the idle mode and the connected mode are modes of the terminal apparatus 200.

(5) Cases of Cell Configuration

In the exemplary embodiments of the present invention, there may be various cases of cell configuration.

(a) First Case

In the first case, the base station 100 uses a small cell having a coverage overlapping the coverage 11 in addition to a cell having the coverage 11 (e.g., macro cell). In other words, a small cell (of the base station 100) having a coverage overlapping the coverage 11 is configured. The small cell may be a micro cell, a pico cell, or a femto cell, or may be a cell of another kind that is smaller than a macro cell. As an example, the base station 100 includes a remote unit, and the remote unit configures the small cell. The remote unit may be a remote radio head (RRH) or a remote radio unit (RRU), or may be a unit that also performs physical-layer processing.

In particular, the small cell is a DL only cell and is used as a secondary cell without being used as a primary cell. For example, the base station 100 uses the macro cell as a primary cell and the small cell as a secondary cell to thereby perform radio communication with terminal apparatuses located in the coverages of both of these cells.

Additionally, in particular, the coverage of the small cell overlaps the coverage of a neighbor base station of the base station 100. A description will be given below of an example of the first case of a cell configuration with reference to FIG. 2.

FIG. 2 is an explanatory diagram for describing the example of the first case of the cell configuration. With reference to FIG. 2, the base station 100 and the terminal apparatus 200 are illustrated. In addition, a remote unit 40 of the base station 100 and a neighbor base station 50 of the base station 100 are illustrated. The base station 100 uses a macro cell having the coverage 11 and a small cell having a coverage 41. The small cell is a DL only cell. The neighbor base station 50 uses a macro cell having a coverage 51. In this example, the coverage 41 of the small cell extends to an area 43, which is outside the coverage 11 of the macro cell of the base station 100 and is in the coverage 51 of the macro cell of the neighbor base station 50. The small cell having the coverage 41 and the macro cell having the coverage 51 are cells of different base stations and are hence not usable in carrier aggregation, which means that the area 43 is an unavailable coverage (or unnecessary coverage) for the small cell.

Note that the base station 100 may use multiple small cells instead of one small cell only. In other words, multiple small cells of the base station 100 may be configured. In this case, an unavailable coverage may exist for each of the multiple small cells.

(b) Second Case

In the second case, a neighbor base station of the base station 100 uses, in addition to a macro cell, a small cell having a coverage overlapping the coverage of the macro cell. This means that the macro cell and the small cell (of the neighbor base station) having overlapping coverages are configured. The small cell may be a micro cell, a pico cell, or a femto cell, or may be a cell of another kind that is smaller than a macro cell. As an example, the neighbor base station includes a remote unit, and the remote unit configures the small cell. The remote unit may be an RRH or an RRU, or may be a unit that also performs physical-layer processing.

In particular, the small cell is a DL only cell and is used as a secondary cell without being used as a primary cell. For example, the neighbor base station uses the macro cell as a primary cell and the small cell as a secondary cell to thereby perform radio communication with terminal apparatuses located in the coverages of both of these cells.

Additionally, in particular, the coverage of the small cell overlaps the coverage 11 of the base station 100. A description will be given below of an example of the second case of the cell configuration with reference to FIG. 3.

FIG. 3 is an explanatory diagram for describing the example of the second case of the cell configuration. With reference to FIG. 3, the base station 100 and the terminal apparatus 200 are illustrated. In addition, a neighbor base station 60 of the base station 100 and a remote unit 70 of the neighbor base station 60 are illustrated. The base station 100 uses a macro cell having the coverage 11. The neighbor base station 60 uses a macro cell having a coverage 61 and a small cell having a coverage 71. The small cell is a DL only cell. In this example, the coverage 71 of the small cell extends to an area 73, which is outside the coverage 61 of the macro cell of the neighbor base station 60 and is in the coverage 11 of the macro cell of the base station 100. The small cell having the coverage 71 and the macro cell having the coverage 11 are cells of different base stations and are hence not usable in carrier aggregation, which means that the area 73 is an unavailable coverage (or unnecessary coverage) for the small cell.

Note that the neighbor base station 60 may use multiple small cells instead of one small cell only. In other words, multiple small cells of the neighbor base station 60 may be configured. Moreover, small cells of other neighbor base stations may also be configured in addition to the small cell(s) of the neighbor base station 60.

(c) Others

The first case and the second case described above may exist together. Specifically, the neighbor base station 50 and the neighbor base station 60 may exist as neighbor base stations of the base station 100, and the small cell having the coverage 41 and the small cell having the coverage 71 may be configured. Accordingly, both the area 43 and the area 73, which are unavailable coverages, may exist.

The first case and the second case described above are examples, and other cases for the cell configuration may also be possible for the exemplary embodiments of the present invention.

Note that, in the above-described various cases, the macro cell and the small cell use different frequencies, for example. More specifically, for example, the macro cell and the small cell use component carriers (CCs) different from each other.

4. First Exemplary Embodiment

Next, a first exemplary embodiment of the present invention is described with reference to FIG. 4 to FIG. 11.

<4.1. Example of Configuration of Base Station>

Figure 4:
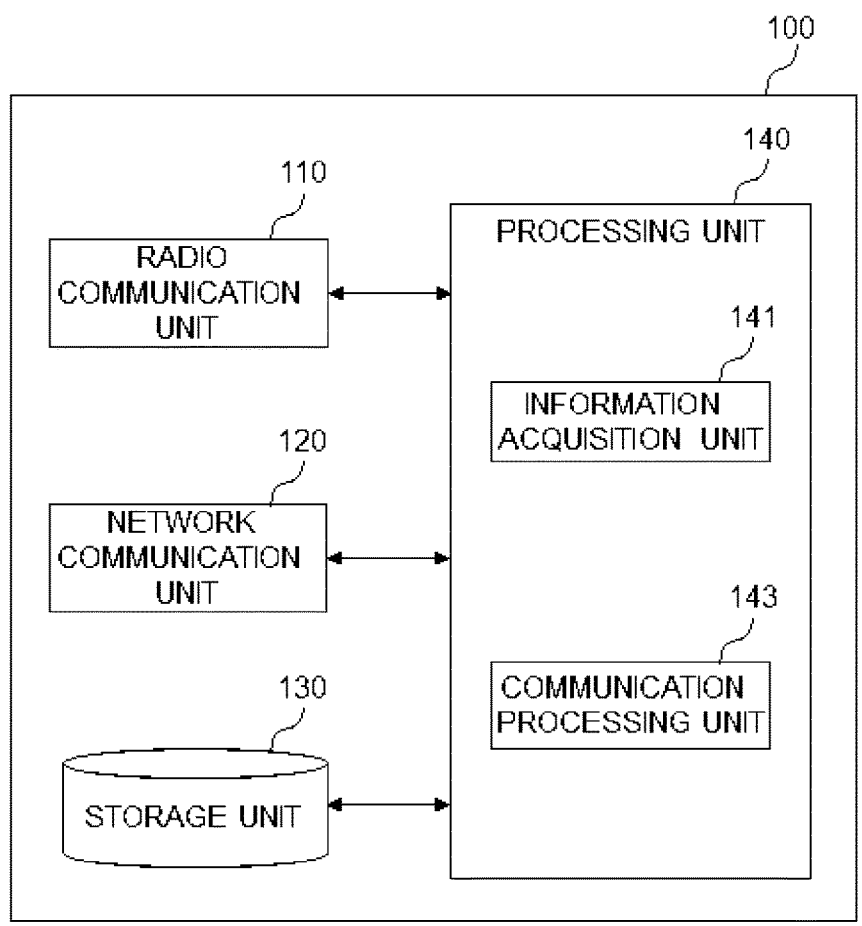
FIG. 4 is a block diagram illustrating an example of a schematic configuration of a base station according to a first exemplary embodiment.

First, with reference to FIG. 4, an example of a configuration of a base station 100 according to the first exemplary embodiment is described. FIG. 4 is a block diagram illustrating an example of a schematic configuration of the base station 100 according to the first exemplary embodiment. With reference to FIG. 4, the base station 100 includes a radio communication unit 110, a network communication unit 120, a storage unit 130, and a processing unit 140.

The radio communication unit 110 transmits and receives signals wirelessly. For example, the radio communication unit 110 receives signals from a terminal apparatus and transmits signals to the terminal apparatus.

The network communication unit 120 receives signals from a network 30 (e.g., backhaul) and transmits signals to the network 30 (e.g., backhaul).

The storage unit 130 temporarily or permanently stores programs and parameters for operations of the base station 100 as well as various data.

The processing unit 140 provides various functions of the base station 100. The processing unit 140 includes an information acquisition unit 141 and a communication processing unit 143. Note that the processing unit 140 may further include other constituent components than these constituent components. In other words, the processing unit 140 may perform other operations than the operations of these constituent components.

Concrete operations of the information acquisition unit 141 and the communication processing unit 143 will be described later in detail.

The radio communication unit 110 may include an antenna, a radio frequency (RF) circuit, and the like. The network communication unit 120 may include a network adapter, a network interface card, or the like. The storage unit 130 may include a memory (e.g., a nonvolatile memory and/or a volatile memory) and/or a hard disk, and the like.

The processing unit 140 may include a baseband (BB) processor and/or another processor, and the like.

<4.2. Example of Configuration of Terminal Apparatus>

Figure 5:
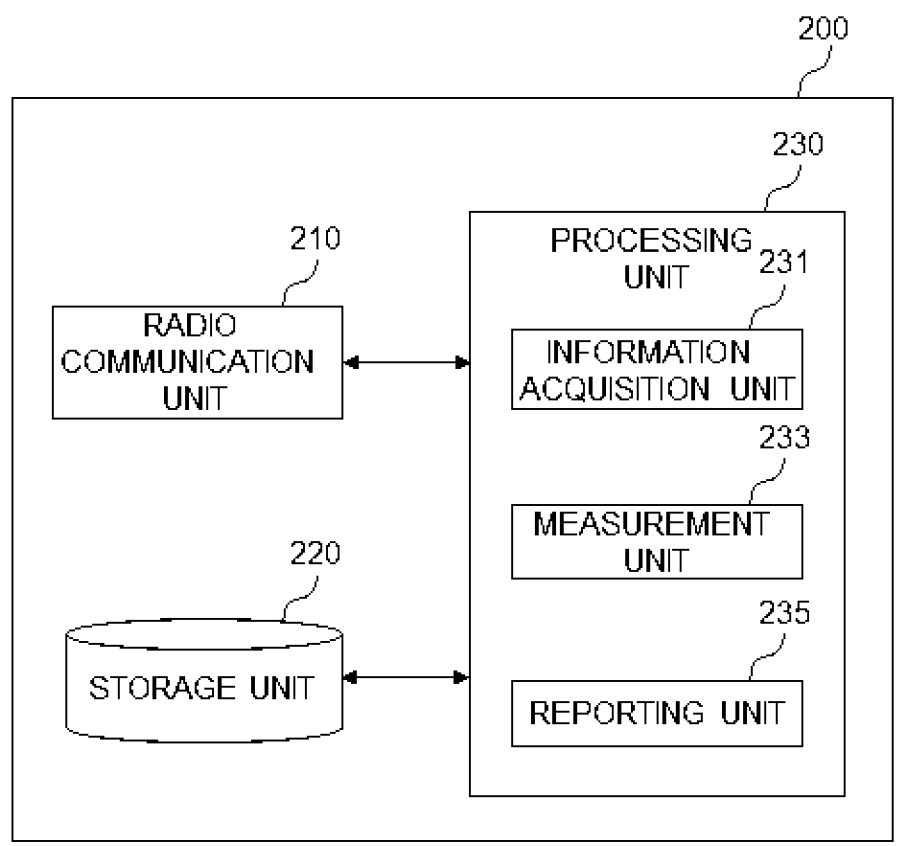
FIG. 5 is a block diagram illustrating an example of a schematic configuration of a terminal apparatus according to the first exemplary embodiment.

Next, with reference to FIG. 5, an example of a configuration of the terminal apparatus 200 according to the first exemplary embodiment is described. FIG. 5 is a block diagram illustrating an example of a schematic configuration of a terminal apparatus 200 according to the first exemplary embodiment. With reference to FIG. 5, the terminal apparatus 200 includes a radio communication unit 210, a storage unit 220, and a processing unit 230.

The radio communication unit 210 transmits and receives signals wirelessly. For example, the radio communication unit 210 receives signals from a base station and transmits signals to the base station.

The storage unit 220 temporarily or permanently stores programs and parameters for operations of the terminal apparatus 200 as well as various data.

The processing unit 230 provides various functions of the terminal apparatus 200. The processing unit 230 includes an information acquisition unit 231, a measurement unit 233, and a report unit 235. Note that the processing unit 230 may further include other constituent components than these constituent components. In other words, the processing unit 230 may perform other operations than the operations of these constituent components.

Concrete operations of the information acquisition unit 231, the measurement unit 233, and the report unit 235 will be described later in detail.

The radio communication unit 210 may include an antenna, a radio frequency (RF) circuit, and the like. The storage unit 220 may include a memory (e.g., a nonvolatile memory and/or a volatile memory) and/or a hard disk, and the like. The processing unit 230 may include a baseband (BB) processor and/or another processor, and the like.

<4.3. Example of Configuration of Network Node>

Figure 6:
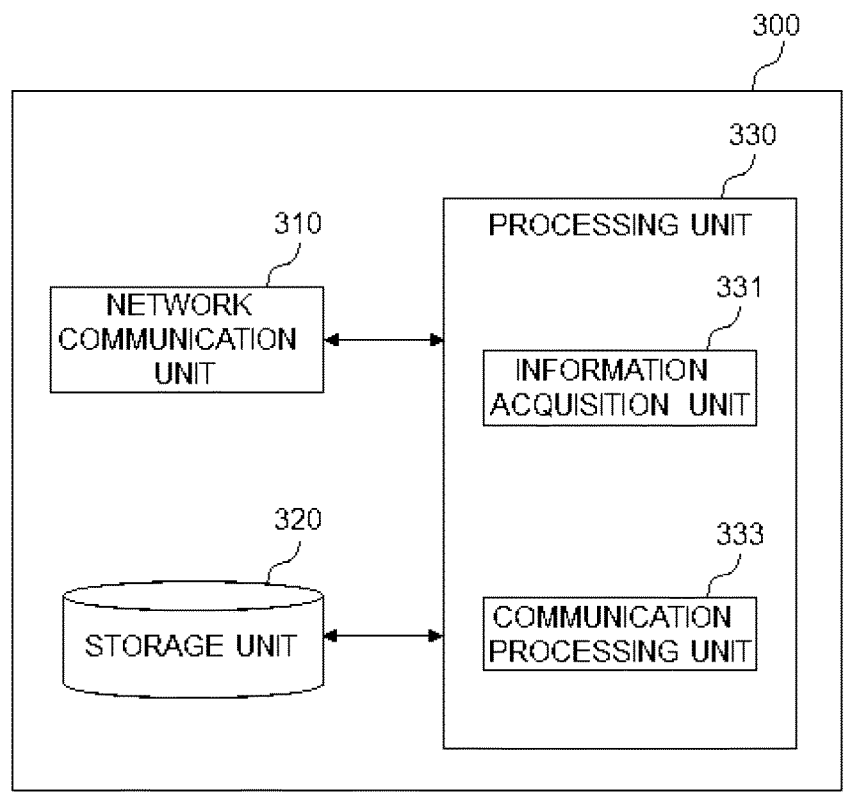
FIG. 6 is a block diagram illustrating an example of a schematic configuration of a network node according to the first exemplary embodiment.

Next, with reference to FIG. 6, an example of a configuration of the network node 300 according to the first exemplary embodiment is described. FIG. 6 is a block diagram illustrating an example of a schematic configuration of the network node 300 according to the first exemplary embodiment. With reference to FIG. 6, the network node 300 includes a network communication unit 310, a storage unit 320, and a processing unit 330.

The network communication unit 310 receives signals from the network 30 and transmits signals to the network 30.

The storage unit 320 temporarily or permanently stores programs and parameters for operations of the network node 300 as well as various data.

The processing unit 330 provides various functions of the network node 300. The processing unit 330 includes an information acquisition unit 331 and a communication processing unit 333. Note that the processing unit 330 may further include other constituent components than these constituent components. In other words, the processing unit 330 may perform other operations than the operations of these constituent components.

Concrete operations of the information acquisition unit 331 and the communication processing unit 333 will be described later in detail.

Note that the network communication unit 310 may include a network adapter, a network interface card, or the like. The storage unit 320 may include a memory (e.g., a nonvolatile memory and/or a volatile memory) and/or a hard disk, and the like. The processing unit 330 may include a processor and the like.

<4.4. Technical Features>

Next, technical features of the first exemplary embodiment are described with reference to FIG. 7 to FIG. 11.

(1) Target Cell Information

The base station 100 (information acquisition unit 141) acquires target cell information indicating a target cell of MDT measurements in the idle mode of the terminal apparatus 200. The base station 100 (communication processing unit 143) then transmits the target cell information to the terminal apparatus 200. The target cell includes a DL only cell. The target cell information may indicate two or more target cells. In this case, the two or more target cells may further include UL and DL cells in addition to the DL only cell or may include only DL only cells.

The terminal apparatus 200 (information acquisition unit 231) acquires the target cell information. The terminal apparatus 200 (measurement unit 233) then performs the MDT measurements on the basis of the target cell information.

(a) MDT Measurements in Idle Mode

The MDT measurements in the idle mode are rephrased as MDT measurements performed by a terminal apparatus in the idle mode. For example, the MDT measurements in the idle mode are Logged MDT measurements (i.e., measurements for Logged MDT).

(b) DL Only Cell (Target Cell)

Band

For example, the DL only cell is a cell of a downlink-dedicated band. For example, the downlink-dedicated band is Band 29 or Band 32. The downlink-dedicated band or a component carrier (CC) included in the downlink-dedicated band may also be referred to as a supplemental downlink, a supplemental downlink spectrum, or a supplemental downlink channel.

Alternatively, the DL only cell may be a cell of a band other than the downlink-dedicated band or may be a cell used only for the DL without being used for the UL by the operator.

Cell Configuration

First Case

For example, in the above-described first case of the cell configuration (refer to FIG. 2), the DL only cell is the cell of the base station 100. For example, with reference to FIG. 2 again, the DL only cell is the small cell of the base station 100 with the coverage 41.

This, for example, makes it possible to perform Logged MDT measurements targeting the DL only cell of the base station 100.

Second Case

For example, in the above-described second case of the cell configuration (refer to FIG. 3), the DL only cell is a cell of another base station different from the base station 100 (e.g., a neighbor base station of the base station 100). For example, with reference to FIG. 3 again, the DL only cell is the small cell of the neighbor base station 60 with the coverage 71.

This, for example, makes it possible to perform Logged MDT measurements targeting the DL only cell of the other base station (e.g., neighbor base station) different from the base station 100.

(c) Contents of Target Cell Information

For example, the target cell information includes the cell ID of the DL only cell, band information indicating the frequency band of the DL only cell, and/or frequency information indicating the frequency of the DL only cell. This, for example, enables the terminal apparatus 200 to easily find the DL only cell and perform measurements.

(d) Acquisition

For example, the network node 300 (information acquisition unit 331) acquires the target cell information. The network node 300 (communication processing unit 333) then transmits the target cell information to the base station 100. In this case, the base station 100 (information acquisition unit 141) acquires the target cell information transmitted by the network node 300. The network node 300 may store the target cell information in advance or may generate the target cell information by itself.

Specifically, for example, the network node 300 transmits an MDT configuration including the target cell information to the base station 100. The base station 100 (information acquisition unit 141) then acquires the MDT configuration including the target cell information.

This, for example, enables control of MDT measurements on the core network side.

Alternatively, the base station 100 may store the target cell information in advance or may generate the target cell information by itself. The base station 100 (information acquisition unit 141) may then acquire the target cell information.

(e) Transmission

For example, the target cell information is included in configuration parameters for the MDT (e.g., Logged MDT) in the idle mode. For example, the configuration parameters are included in the MDT configuration transmitted by the network node 300. The base station 100 (communication processing unit 143) transmits a message including the configuration parameters to the terminal apparatus 200. For example, the message is a Logged Measurement Configuration message.

This, for example, makes it possible to transmit the target cell information during an existing procedure.

Note that the base station 100 (communication processing unit 143) may transmit the target cell information in another message. Alternatively, the base station 100 (communication processing unit 143) may transmit the target cell information in system information (e.g., system information block (SIB)) instead of a separate message to the terminal apparatus 200.

(f) Measurements

For example, the terminal apparatus 200 (measurement unit 233) performs MDT measurements (e.g., Logged MDT measurements) for the DL only cell on the basis of the target cell information.

For example, the terminal apparatus 200 (measurement unit 233) measures receive power and/or receive quality (e.g., RSRP and/or RSRQ) for the DL only cell.

Moreover, for example, the terminal apparatus 200 (measurement unit 233) also measures the location of the terminal apparatus 200. For example, the terminal apparatus 200 (measurement unit 233) measures the location of the terminal apparatus 200 by the use of the Global Navigation Satellite System (GNSS).

For example, measurements as above are performed, and a pair of information indicating the receive power and/or receive quality and information indicating the location of the terminal apparatus 200 is obtained as a measurement result.

(g) Others

The first case and the second case of the cell configuration described above may exist together.

As an example, first target cell information for the first case (e.g., information indicating the small cell having the coverage 41 illustrated in FIG. 2) and second target cell information for the second case (e.g., information indicating the small cell having the coverage 71 illustrated in FIG. 3) may exist together. The base station 100 may transmit the first target cell information and the second target cell information to the terminal apparatus 200. The terminal apparatus 200 may then perform the MDT measurements (e.g., Logged MDT measurements for the small cell having the coverage 41 and/or Logged MDT measurements for the small cell having the coverage 71) on the basis of the first target cell information and the second target cell information.

As another example, the target cell information may indicate two or more target cells, and the two or more target cells may include the DL only cell in the first case (e.g., the small cell having the coverage 41) and the DL only cell in the second case (e.g., the small cell having the coverage 71). The base station 100 may transmit the target cell information to the terminal apparatus 200. The terminal apparatus 200 may then perform the MDT measurements (e.g., Logged MDT measurements for the small cell having the coverage 41 and/or Logged MDT measurements for the small cell having the coverage 71) on the basis of the target cell information.

For example, as described above, the base station 100 transmits the target cell information to the terminal apparatus 200, and the terminal apparatus 200 performs the MDT measurements on the basis of the target cell information. This, for example, enables the terminal apparatus 200 in the idle mode to perform MDT measurements on the DL only cell. In other words, it is possible for not only the terminal apparatus 200 in the connected mode but also the terminal apparatus 200 in the idle mode to perform MDT measurements on the DL only cell. Hence, information for optimal area design of a DL only cell may be collected more efficiently.

(2) Initiation Condition Information/Termination Condition Information

For example, the base station 100 (information acquisition unit 141) acquires initiation condition information relating to an initiation condition for the MDT measurements and termination condition information relating to a termination condition for the MDT measurements. The base station 100 (communication processing unit 143) then transmits the initiation condition information and the termination condition information to the terminal apparatus 200.

For example, the terminal apparatus 200 (information acquisition unit 231) acquires the initiation condition information and the termination condition information. The terminal apparatus 200 (measurement unit 233) then initiates the MDT measurements on the basis of the initiation condition information and terminates the MDT measurements on the basis of the termination condition information.

(a) Contents of Initiation Condition Information/Termination Condition Information The initiation condition information and the termination condition information may be different between the above-described first case of the cell configuration (refer to FIG. 2) and the above-described second case of the cell configuration (refer to FIG. 3).

(a-1) First Case of Cell Configuration

First, a description is given of contents of the initiation condition information and the termination condition information in the above-described first case of the cell configuration (refer to FIG. 2). As described above, in the first case, the DL only cell is a cell of the base station 100 (e.g., the small cell having the coverage 41 illustrated in FIG. 2).

Initiation

For example, the initiation condition includes selection of a specific cell in cell reselection, and the initiation condition information includes cell information indicating the specific cell. In this case, in response to selection of the specific cell in the cell reselection (i.e., camping-on the specific cell), the terminal apparatus 200 (measurement unit 233) initiates the MDT measurements.

For example, the specific cell is a cell unavailable cell for carrier aggregation with the DL only cell, and is more specifically, for example, a cell of another base station different from the base station 100. In addition, for example, the specific cell is a cell having a coverage overlapping the coverage of the DL only cell. With reference to FIG. 2 again, for example, the DL only cell is the small cell of the base station 100 with the coverage 41, and the specific cell is the macro cell of the neighbor base station 50 with the coverage 51.

For example, the cell information indicating the specific cell is the cell ID of the specific cell (e.g., the macro cell of the neighbor base station 50 with the coverage 51).

Note that the initiation condition may further include that a measurement value of the DL only cell is better than a threshold, and the initiation condition information may further include threshold information indicating the threshold. In this case, when the terminal apparatus 200 (measurement unit 233) selects the specific cell in cell reselection and the measurement value of the DL only cell is better than the threshold (i.e., the terminal apparatus 200 is located in the coverage of the DL only cell), the terminal apparatus 200 (measurement unit 233) may initiate the MDT measurements.

Termination

For example, the termination condition includes that a measurement value of the DL only cell is worse than a threshold, and the termination condition information includes threshold information indicating the threshold. In this case, when the measurement value is worse than the threshold, the terminal apparatus 200 (measurement unit 233) terminates the MDT measurements.

For example, the measurement value is receive power or receive quality (e.g., RSRP or RSRQ) for the DL only cell. In this case, for example, when receive power or receive quality for the DL only cell is worse than the threshold, the terminal apparatus 200 in the idle mode terminates the MDT measurements. In other words, in response to moving out of the coverage of the DL only cell (or moving away from the coverage), the terminal apparatus 200 in the idle mode terminates the MDT measurements.

Note that the termination condition may include selection of a cell of the base station 100 (e.g., the macro cell having the coverage 11) in another cell reselection. In this case, in response to selection of a cell of the base station 100 (e.g., the macro cell of the coverage 11) in another cell reselection, the terminal apparatus 200 (measurement unit 233) may terminate the MDT measurements.

Initiation/Termination Example

Figure 7:
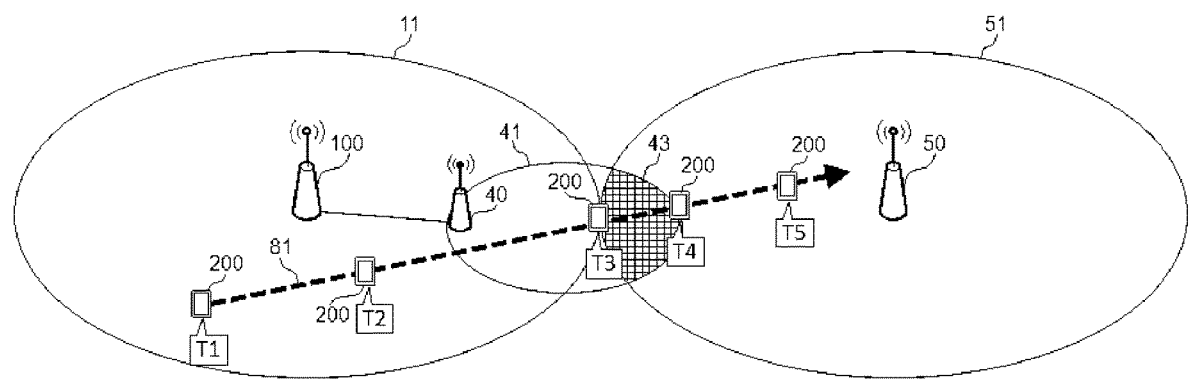
FIG. 7 is an explanatory diagram for describing an example of initiation and termination of Logged MDT measurements in a first case of the cell configuration.

FIG. 7 is an explanatory diagram for describing an example of initiation and termination of Logged MDT measurements in the first case of the cell configuration. With reference to FIG. 7, as in FIG. 2, the base station 100, the terminal apparatus 200, the remote unit 40 of the base station 100, and the neighbor base station 50 are illustrated. The coverage 41 is the coverage of the DL only cell and includes the area 43, which is an unavailable coverage. In this example, the terminal apparatus 200 moves according to a route 81.

At timing T1, the terminal apparatus 200 is in the connected mode and can communicate with the base station 100. The base station 100 transmits the initiation condition information and the termination condition information to the terminal apparatus 200, in addition to the target cell information.

At timing T2, the terminal apparatus 200 makes a transition from the connected mode to the idle mode. The terminal apparatus 200 then camps on a cell of the base station 100 (the macro cell having the coverage 11).

At timing T3, the terminal apparatus 200 performs cell reselection. In the cell reselection, the terminal apparatus 200 selects the macro cell of the neighbor base station 50 with the coverage 51 (i.e., the specific cell indicated by the cell information included in the initiation condition information). In other words, the terminal apparatus 200 camps on the macro cell of the neighbor base station 50. Hence, the terminal apparatus 200 initiates MDT measurements for the DL only cell (the cell having the coverage 41). The terminal apparatus 200 logs results of the MDT measurements (until the MDT measurements terminate).

At timing T4, the measurement value of the DL only cell (the cell having the coverage 41) is worse than the threshold (i.e., the threshold indicated by the threshold information included in the termination condition information). Hence, the terminal apparatus 200 terminates the MDT measurements.

At timing T5, the terminal apparatus 200 makes a transition from the idle mode to the connected mode. The terminal apparatus 200 then reports the logged results of the MDT measurements to the neighbor base station 50.

With the initiation condition and the termination condition as above, the terminal apparatus 200 can, for example, initiate the MDT measurements when entering an unavailable coverage, and terminate the MDT measurements in response to moving out of the unavailable coverage.

(a-2) Second Case of Cell Configuration

Next, a description is given of contents of the initiation condition information and the termination condition information in the above-described second case of the cell configuration (refer to FIG. 3). As described above, in the second case, the DL only cell is a cell of another base station different from the base station 100 (e.g., the small cell having the coverage 71 illustrated in FIG. 3).

Initiation

For example, the initiation condition includes that a measurement value of the DL only cell is better than a threshold, and the initiation condition information includes threshold information indicating the threshold. In this case, when the measurement value is better than the threshold, the terminal apparatus 200 (measurement unit 233) initiates the MDT measurements.

For example, the measurement value is receive power or receive quality (e.g., RSRP or RSRQ) for the DL only cell. In this case, for example, when receive power or receive quality for the DL only cell is better than the threshold, the terminal apparatus 200 in the idle mode initiates the MDT measurements. In other words, when entering the coverage of the DL only cell (or moving close to the coverage), the terminal apparatus 200 in the idle mode initiates the MDT measurements.

Termination

For example, the termination condition includes selection of a specific cell in cell reselection, and the termination condition information includes cell information indicating the specific cell. In this case, in response to selection of the specific cell in the cell reselection (i.e., camping-on the specific cell), the terminal apparatus 200 (measurement unit 233) terminates the MDT measurements.

For example, the specific cell is a usable cell in carrier aggregation together with the DL only cell, and is more specifically, for example, a cell of the other base station different from the base station 100. In addition, for example, the specific cell is a cell having a coverage overlapping the coverage of the DL only cell. With reference to FIG. 3 again, for example, the DL only cell is the small cell of the neighbor base station 60 with the coverage 71, and the specific cell is the macro cell of the neighbor base station 60 with the coverage 61.

For example, the cell information indicating the specific cell is the cell ID of the specific cell (e.g., the macro cell of the neighbor base station 60 with the coverage 61).

Note that the termination condition may include that a measurement value of the DL only cell is worse than a threshold, and the termination condition information may further include threshold information indicating the threshold. In this case, when a measurement value of the DL only cell is worse than the threshold (i.e., the terminal apparatus 200 moves out of (or moves away from) the coverage of the DL only cell), even if the terminal apparatus 200 (measurement unit 233) does not select the specific cell in cell reselection, the terminal apparatus 200 (measurement unit 233) may terminate the MDT measurements.

Initiation/Termination Example

Figure 8:
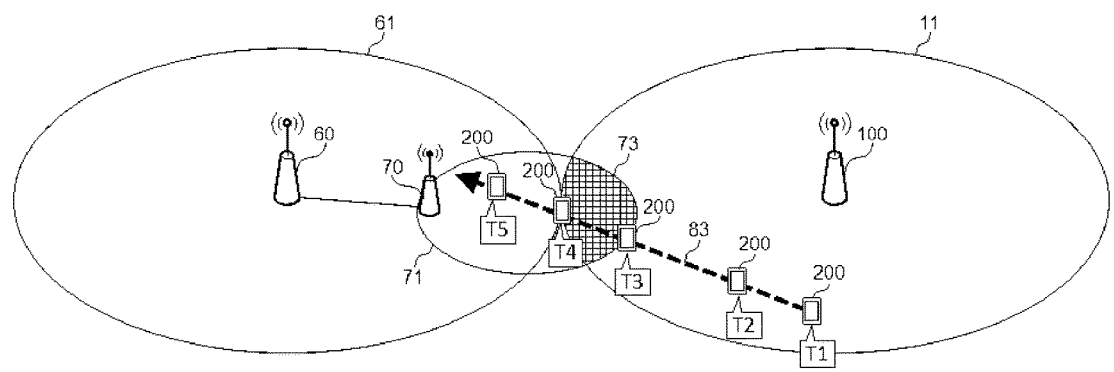
FIG. 8 is an explanatory diagram for illustrating an example of initiation and termination of Logged MDT measurements in a second case of the cell configuration.

FIG. 8 is an explanatory diagram for illustrating an example of initiation and termination of Logged MDT measurements in the second case of the cell configuration. With reference to FIG. 8, as in FIG. 3, the base station 100, the terminal apparatus 200, the neighbor base station 60, and the remote unit 70 of the neighbor base station 60 are illustrated. The coverage 71 is the coverage of the DL only cell and includes the area 73, which is an unavailable coverage. In this example, the terminal apparatus 200 moves according to a route 83.

At timing T1, the terminal apparatus 200 is in the connected mode and can communicate with the base station 100. The base station 100 transmits the initiation condition information and the termination condition information to the terminal apparatus 200, in addition to the target cell information.

At timing T2, the terminal apparatus 200 makes a transition from the connected mode to the idle mode. The terminal apparatus 200 then camps on a cell of the base station 100 (the macro cell having the coverage 11).

At timing T3, a measurement value of the DL only cell (the cell having the coverage 71) is better than the threshold (i.e., the threshold indicated by the threshold information included in the initiation condition information). Hence, the terminal apparatus 200 initiates the MDT measurements. The terminal apparatus 200 logs results of the MDT measurements (until the MDT measurements terminate).

At timing T4, the terminal apparatus 200 performs cell reselection. In the cell reselection, the terminal apparatus 200 selects the macro cell of the neighbor base station 60 with the coverage 61 (i.e., the specific cell indicated by the cell information included in the termination condition information). In other words, the terminal apparatus 200 camps on the macro cell of the neighbor base station 60. Hence, the terminal apparatus 200 terminates MDT measurements for the DL only cell (the cell having the coverage 71).

At timing T5, the terminal apparatus 200 makes a transition from the idle mode to the connected mode. The terminal apparatus 200 then reports the logged results of the MDT measurements to the neighbor base station 60.

With the initiation condition and the termination condition as above, the terminal apparatus 200 can, for example, initiate the MDT measurements when entering an unavailable coverage, and terminate the MDT measurements in response to moving out of the unavailable coverage.

(a-3) Others

Without being limited to the above-described cases of the cell configuration, the termination condition may include that a measurement time period expires, and the termination condition information may include time period information indicating the measurement time period. In this case, when the measurement time period expires, the terminal apparatus 200 (measurement unit 233) may terminate the MDT measurements. The time period information may be information directly indicating the measurement time period (e.g., an index or a timer value corresponding to the measurement time period, or the like) or information indirectly indicating the measurement time period (e.g., the expiration time/expiration time point of the measurement time period).

This may, for example, prevent the terminal apparatus 200 from continuing performing the MDT measurements when the terminal apparatus 200 remains in an unavailable coverage.

(b) Acquisition

For example, the base station 100 (information acquisition unit 141) acquires the initiation condition information and the termination condition information as with the target cell information.

For example, the network node 300 (information acquisition unit 331) acquires the initiation condition information and the termination condition information. The network node 300 (communication processing unit 333) then transmits the initiation condition information and the termination condition information to the base station 100. In this case, the base station 100 (information acquisition unit 141) acquires the initiation condition information and the termination condition information transmitted by the network node 300. The network node 300 may store the initiation condition information and the termination condition information in advance or may generate the initiation condition information and the termination condition information by itself.

Specifically, for example, the network node 300 transmits an MDT configuration including the initiation condition information and the termination condition information to the base station 100. The base station 100 (information acquisition unit 141) then acquires the MDT configuration including the initiation condition information and the termination condition information.

This, for example, enables control of initiation/termination of MDT measurements on the core network side.

Alternatively, the base station 100 may store the initiation condition information and the termination condition information in advance or may generate the initiation condition information and the termination condition information by itself. The base station 100 (information acquisition unit 141) may then acquire the initiation condition information and the termination condition information.

(c) Transmission

For example, the base station 100 (communication processing unit 143) transmits the initiation condition information and the termination condition information to the terminal apparatus 200 as with the target cell information.

For example, the initiation condition information and the termination condition information are included in configuration parameters for MDT in the idle mode (e.g., Logged MDT). The base station 100 (communication processing unit 143) transmits a message including the configuration parameters to the terminal apparatus 200. For example, the message is a Logged Measurement Configuration message.

Note that the base station 100 (communication processing unit 143) may transmit the initiation condition information and the termination condition information in another message. Alternatively, the base station 100 (communication processing unit 143) may transmit the initiation condition information and the termination condition information in system information (e.g., SIB), instead of a separate message to the terminal apparatus 200.

(d) Others

The first case and the second case of the cell configuration described above may exist together. In this case, first initiation condition information and first termination condition information for the first case (e.g., initiation condition information and termination condition information for the small cell having the coverage 41 illustrated in FIG. 2) and second initiation condition information and second termination condition information for the second case (e.g., initiation condition information and termination condition information for the small cell having the coverage 71 illustrated in FIG. 3) may exist. The base station 100 may transmit the first initiation condition information and the first termination condition information as well as the second initiation condition information and the second termination condition information to the terminal apparatus 200. The terminal apparatus 200 may then initiate and terminate the MDT measurements (e.g., Logged MDT measurements for the small cell having the coverage 41 illustrated in FIG. 2) on the basis of the first initiation condition information and the first termination condition information. Alternatively, or in addition, the terminal apparatus 200 may initiate and terminate the MDT measurements (e.g., Logged MDT measurements for the small cell having the coverage 71 illustrated in FIG. 3) on the basis of the second initiation condition information and the second termination condition information.

For example, as described above, the base station 100 transmits the initiation condition information and the termination condition information to the terminal apparatus 200, and the terminal apparatus 200 initiates the MDT measurements on the basis of the initiation condition information and terminates the MDT measurements on the basis of the termination condition information. This enables, for example, control of initiation/termination timing of the MDT measurements by the terminal apparatus 200. Hence, measurements for the DL only cell may be performed only within the limited time period. Consequently, information for optimal area design of a DL only cell may be collected more efficiently.

Note that the base station 100 may transmit the initiation condition information to the terminal apparatus 200 without transmitting the termination condition information to the terminal apparatus 200, and the terminal apparatus 200 may initiate the MDT measurements on the basis of the initiation condition information. Alternatively, the base station 100 may transmit the termination condition information to the terminal apparatus 200 without transmitting the initiation condition information to the terminal apparatus 200, and the terminal apparatus 200 may terminate the MDT measurements on the basis of the termination condition information.

(3) Reporting (a) Reporting by Terminal Apparatus

For example, the terminal apparatus 200 (measurement unit 233) logs results of the MDT measurements. The terminal apparatus 200 (report unit 235) then reports the logged results of the MDT measurements to a base station.

More specifically, for example, the terminal apparatus 200 (measurement unit 233) performs the MDT measurements while being in the idle mode and logs results of the MDT measurements. The terminal apparatus 200 (report unit 235) then reports the logged results of the MDT measurements to the base station after entering the connected mode. For example, in response to reception of a specific message (e.g., a UE Information Request message) transmitted by the base station, the terminal apparatus 200 (report unit 235) transmits a message including the logged results of the MDT measurements (e.g., a UE Information Response message) to the base station.

For example, with reference to FIG. 7 again, the terminal apparatus 200 (report unit 235) reports the logged results of the MDT measurements to the neighbor base station 50.

For example, with reference to FIG. 8 again, the terminal apparatus 200 (report unit 235) reports the logged results of the MDT measurements to the neighbor base station 60.

(b) Reporting by Base Station

For example, the base station (e.g., the neighbor base station 50 or the neighbor base station 60) reports the result of the MDT measurements reported by the terminal apparatus 200, to the network node 300 (or another network node). For example, the base station performs trace record reporting.

Note that, for example, when the terminal apparatus (terminal apparatus 200 or another terminal apparatus) reports results of MDT measurements to the base station 100, the base station 100 (communication processing unit 143) transmits the results of the MDT measurements to the network node 300 (or another network node).

(4) Flow of Processing

Figure 9:
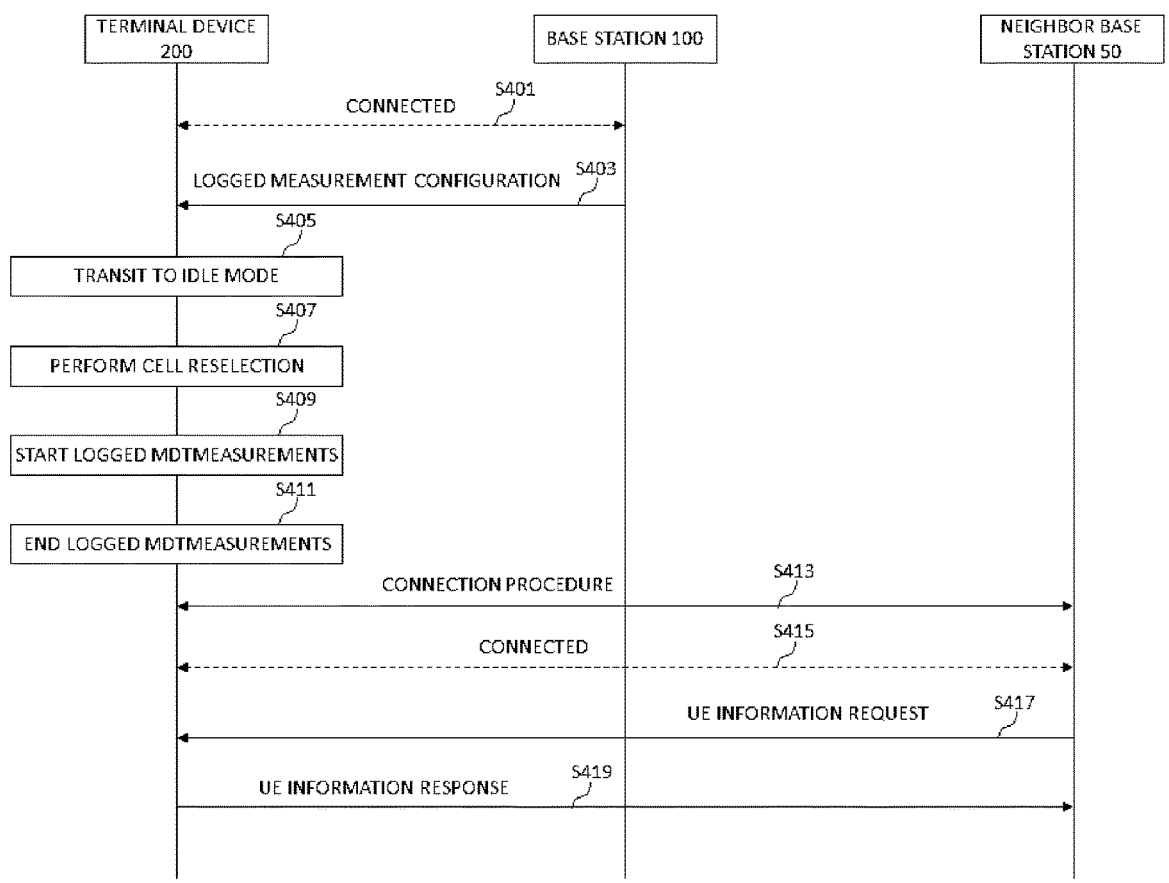
FIG. 9 is a sequence diagram illustrating a first example of a schematic flow of processing by the base station and the terminal apparatus according to the first exemplary embodiment.
Figure 10:
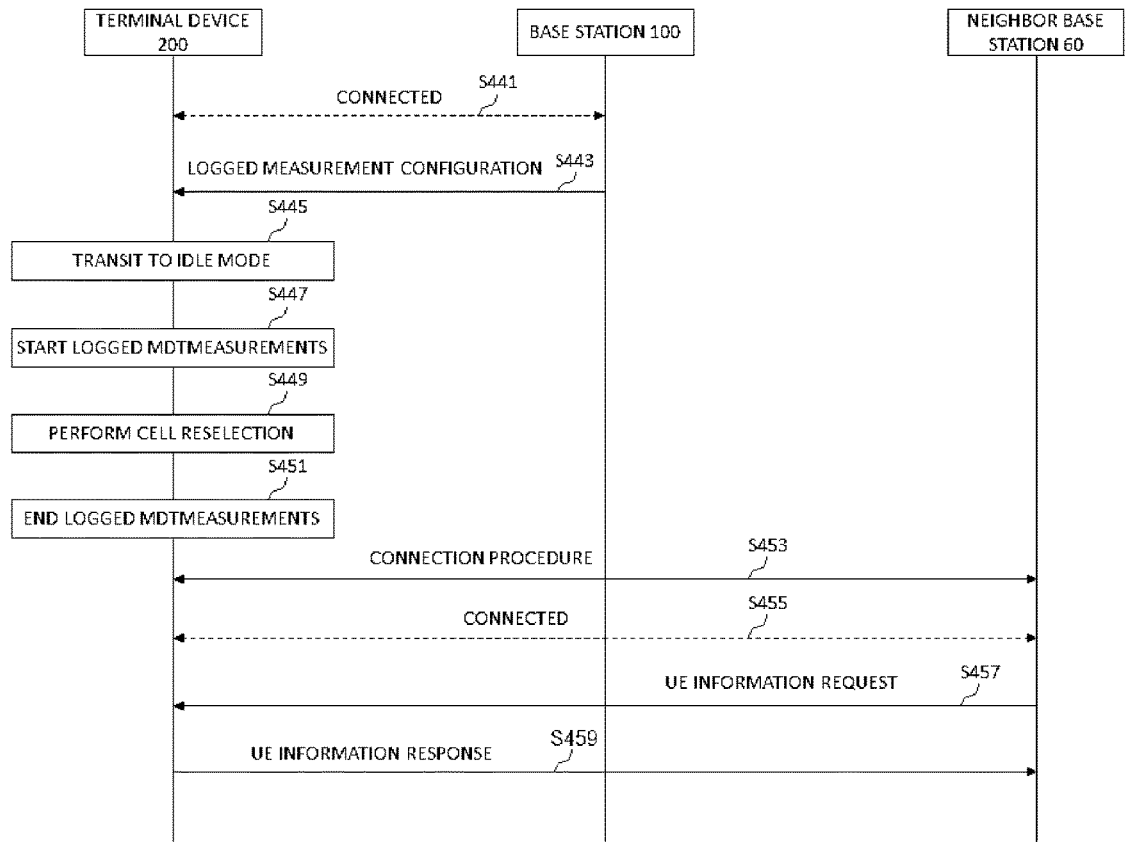
FIG. 10 is a sequence diagram illustrating a second example of a schematic flow of processing by the base station and the terminal apparatus according to the first exemplary embodiment.
Figure 11:
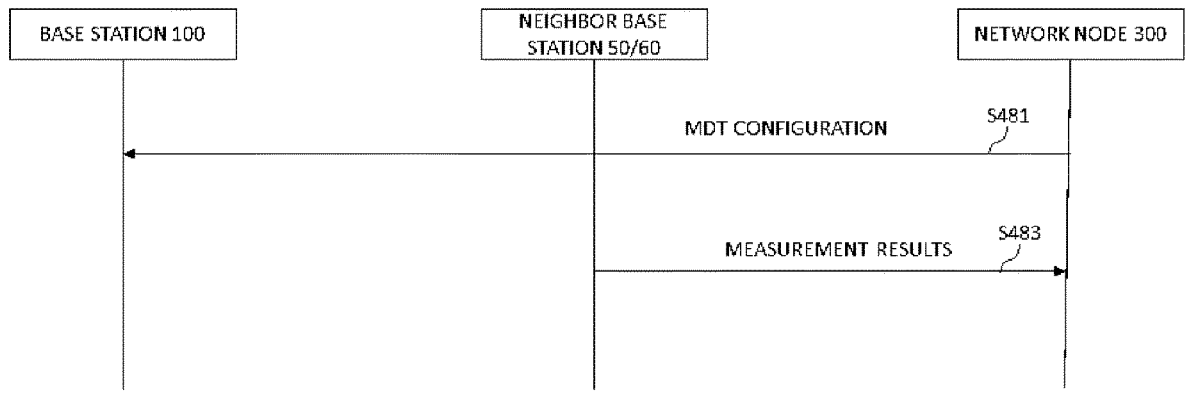
FIG. 11 is a sequence diagram illustrating an example of a schematic flow of processing by the base station and the network node according to the first exemplary embodiment.

With reference to FIG. 9 to FIG. 11, an example of a flow of processing according to the first exemplary embodiment is described.

(a) First Case

FIG. 9 is a sequence diagram illustrating a first example of a schematic flow of processing by the base station and the terminal apparatus according to the first exemplary embodiment. The first example is an example of the flow of the processing in the first case of the cell configuration (as that illustrated in FIG. 2, for example). In this example, the terminal apparatus 200 moves according to the route 81 as illustrated in FIG. 7, for example.

First, the terminal apparatus 200 is connected to the base station 100 (S401). In other words, the terminal apparatus 200 is in the connected mode.

The base station 100 transmits a Logged Measurement Configuration message to the terminal apparatus 200 (S403). The terminal apparatus 200 then receives the Logged Measurement Configuration message. The Logged Measurement Configuration message includes configuration parameters for Logged MDT. In particular, the configuration parameters include target cell information indicating a target cell of Logged MDT measurements, and the target cell includes a DL only cell (e.g., the small cell having the coverage 41 indicated in FIG. 2). For example, the target cell information includes the cell ID of the DL only cell, band information indicating the frequency band of the DL only cell, and/or frequency information indicating the frequency of the DL only cell. Moreover, the configuration parameters include initiation condition information relating to an initiation condition of the Logged MDT measurements and termination condition information relating to a termination condition of the Logged MDT measurements. The initiation condition information includes the cell ID of a specific cell (e.g., the macro cell of the neighbor base station 50 with the coverage 51 illustrated in FIG. 2), and the termination condition information includes threshold information indicating a threshold to be compared with measurement values. The termination condition information may include time period information indicating a measurement time period.

At a time point, the terminal apparatus 200 makes a transition from the connected mode to the idle mode (S405). The terminal apparatus 200 then camps on a cell of the base station 100 (the macro cell having the coverage 11).

Moreover, the terminal apparatus 200 performs cell reselection (S407). For example, in the cell reselection, the terminal apparatus 200 selects the macro cell of the neighbor base station 50 (with the coverage 51 illustrated in FIG. 2, for example). In other words, the terminal apparatus 200 camps on the macro cell. Here, the cell ID of the macro cell matches the cell ID included in the initiation condition information (the macro cell is the specific cell, in other words). Hence, the terminal apparatus 200 initiates Logged MDT measurements for the DL only cell having the cell ID included in the target cell information (e.g., the small cell having the coverage 41 illustrated in FIG. 2) (S409). The terminal apparatus 200 logs results of the Logged MDT measurements.

Thereafter, a measurement value of the DL only cell is worse than the threshold indicated by the threshold information included in the termination condition information. Hence, the terminal apparatus 200 terminates the Logged MDT measurements (S411).

At a time point, the terminal apparatus 200 is, via a connection procedure (S413), connected to the neighbor base station 50 (S415), and makes a transition from the idle mode to the connected mode.

The neighbor base station 50 transmits a UE Information Request message to the terminal apparatus 200 (S417).

In response to reception of the UE Information Request message, the terminal apparatus 200 transmits a UE Information Response message including the logged results of the Logged MDT measurements, to the neighbor base station 50 (S419).

(b) Second Case

FIG. 10 is a sequence diagram illustrating a second example of a schematic flow of processing by the base station and the terminal apparatus according to the first exemplary embodiment. The second example is an example of the flow of the processing in the second case of the cell configuration (as illustrated in FIG. 3, for example). In this example, the terminal apparatus 200 moves according to the route 83 as illustrated in FIG. 8, for example.

First, the terminal apparatus 200 is connected to the base station 100 (S441). In other words, the terminal apparatus 200 is in the connected mode.

The base station 100 transmits the Logged Measurement Configuration message to the terminal apparatus 200 (S443). The terminal apparatus 200 then receives the Logged Measurement Configuration message. The Logged Measurement Configuration message includes configuration parameters for Logged MDT. In particular, the configuration parameters include target cell information indicating a target cell of Logged MDT measurements, and the target cell includes a DL only cell (e.g., the small cell having the coverage 71 indicated in FIG. 3). For example, the target cell information includes the cell ID of the DL only cell, band information indicating the frequency band of the DL only cell, and/or frequency information indicating the frequency of the DL only cell. Moreover, the configuration parameters include initiation condition information relating to an initiation condition of the Logged MDT measurements and termination condition information relating to a termination condition of the Logged MDT measurements. The initiation condition information includes threshold information indicating a threshold to be compared with measurement values, and the termination condition information includes the cell ID of a specific cell (e.g., the macro cell of the neighbor base station 60 with the coverage 61 illustrated in FIG. 3). The termination condition information may include time period information indicating a measurement time period.

At a time point, the terminal apparatus 200 makes a transition from the connected mode to the idle mode (S445). The terminal apparatus 200 then camps on a cell of the base station 100 (the macro cell having the coverage 11).

In addition, a measurement value of the DL only cell (e.g., the small cell having the coverage 71 illustrated in FIG. 3) is better than the threshold indicated by the threshold information included in the initiation condition information. Hence, the terminal apparatus 200 initiates Logged MDT measurements for the DL only cell having the cell ID included in the target cell information (e.g., the small cell having the coverage 71 illustrated in FIG. 3) (S447). The terminal apparatus 200 logs results of the Logged MDT measurements.

Thereafter, the terminal apparatus 200 performs cell reselection (S449). For example, in the cell reselection, the terminal apparatus 200 selects the macro cell of the neighbor base station 60 (with the coverage 61 illustrated in FIG. 3, for example). In other words, the terminal apparatus 200 camps on the macro cell. Here, the cell ID of the macro cell matches the cell ID included in the termination condition information (the macro cell is the specific cell, in other words). Hence, the terminal apparatus 200 terminates the Logged MDT measurements (S451).

At a time point, the terminal apparatus 200 is, via a connection procedure (S453), connected to the neighbor base station 60 (S455), and makes a transition from the idle mode to the connected mode.

The neighbor base station 60 transmits a UE Information Request message to the terminal apparatus 200 (S457).

In response to reception of the UE Information Request message, the terminal apparatus 200 transmits a UE Information Response message including the logged results of the Logged MDT measurements, to the neighbor base station 50 (S459).

(c) Others

FIG. 11 is a sequence diagram illustrating an example of a schematic flow of processing by the base station and the network node according to the first exemplary embodiment.

The network node 300 transmits an MDT configuration to the base station 100 (S481). For example, the MDT configuration includes the configuration parameters described with reference to FIG. 9 and FIG. 10, and the configuration parameters include the target cell information, the initiation condition information, and the termination condition information.

Then, the base station 100, the terminal apparatus 200, and the neighbor base station 50 or 60 perform processing as that described with reference to FIG. 9 or FIG. 10.

The neighbor base station 50 or 60 then reports the results of the Logged MDT measurements reported by the terminal apparatus 200, to the network node 300 (S483).

Note that, the neighbor base station 50 or 60 may report the results of the Logged MDT measurements to a different network node from the network node 300.

(5) Operation of Neighbor Base Station

In the first exemplary embodiment, a neighbor base station of the base station 100 may also perform similar processing to that of the base station 100.

For example, the base station 100 transmits, to the terminal apparatus, target cell information for the small cell having the coverage 71 illustrated in FIG. 3, initiation condition information and/or termination condition information. Similarly, the neighbor base station 50 illustrated in FIG. 2 may transmit, to the terminal apparatus, target cell information for the small cell having the coverage 41 illustrated in FIG. 2, initiation condition information and/or termination condition information.

For example, the base station 100 transmits, to the terminal apparatus, target cell information for the small cell having the coverage 41 illustrated in FIG. 2, initiation condition information and/or termination condition information. Similarly, the neighbor base station 60 illustrated in FIG. 3 may transmit, to the terminal apparatus, target cell information for the small cell having the coverage 71 illustrated in FIG. 3, initiation condition information and/or termination condition information.

5. Second Exemplary Embodiment

Next, a second exemplary embodiment of the present invention is described with reference to FIG. 12 to FIG. 14.

<5.1. Example of Configuration of Base Station>

Figure 12:
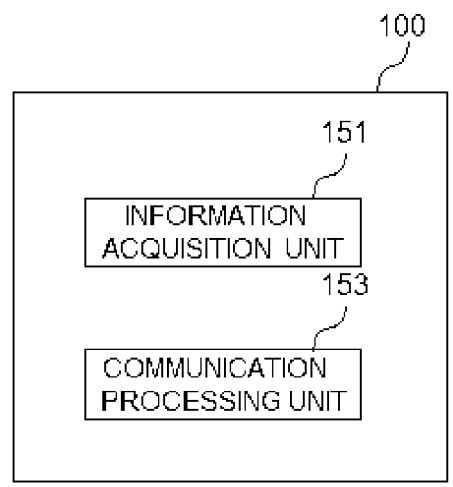
FIG. 12 is a block diagram illustrating an example of a schematic configuration of a base station according to a second exemplary embodiment.

First, with reference to FIG. 12, an example of a configuration of a base station 100 according to the second exemplary embodiment is described. FIG. 12 is a block diagram illustrating an example of a schematic configuration of the base station 100 according to the second exemplary embodiment. With reference to FIG. 12, the base station 100 includes an information acquisition unit 151 and a communication processing unit 153.

Concrete operations of the information acquisition unit 151 and the communication processing unit 153 will be described later.

The information acquisition unit 151 and the communication processing unit 153 may be implemented by a baseband (BB) processor and/or another processor, or the like.

<5.2. Example of Configuration of Terminal Apparatus>

Figure 13:
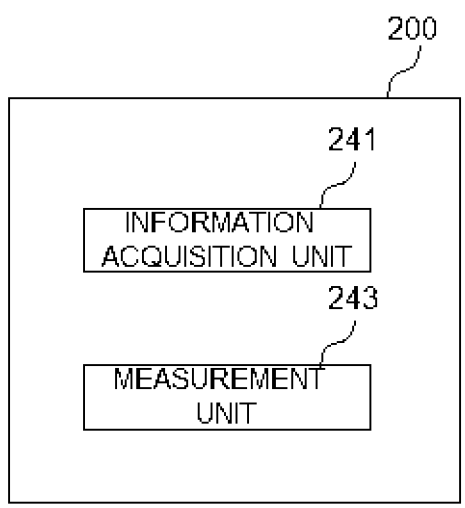
FIG. 13 is a block diagram illustrating an example of a schematic configuration of a terminal apparatus according to the second exemplary embodiment.

Next, with reference to FIG. 13, an example of a configuration of a terminal apparatus 200 according to the second exemplary embodiment is described. FIG. 13 is a block diagram illustrating an example of a schematic configuration of the terminal apparatus 200 according to the second exemplary embodiment. With reference to FIG. 13, the terminal apparatus 200 includes an information acquisition unit 241 and a measurement unit 243.

Concrete operations of the information acquisition unit 241 and the measurement unit 243 will be described later.

The information acquisition unit 241 and the measurement unit 243 may be implemented by a baseband (BB) processor and/or another processor, or the like.

<5.3. Technical Features>

Next, technical features of the second exemplary embodiment are described with reference to FIG. 14.

(1) Target Cell Information

The base station 100 (information acquisition unit 151) acquires target cell information indicating a target cell of MDT measurements in the idle mode of the terminal apparatus 200. The base station 100 (communication processing unit 153) then transmits the target cell information to the terminal apparatus 200. The target cell includes a DL only cell.

The terminal apparatus 200 (information acquisition unit 241) acquires the target cell information. The terminal apparatus 200 (measurement unit 243) then performs the MDT measurements on the basis of the target cell information.

Descriptions of these respects are the same as those in the first exemplary embodiment except for, for example, the differences in reference sign (i.e., the difference between the information acquisition unit 151 and the information acquisition unit 141, the difference between the communication processing unit 153 and the communication processing unit 143, the difference between the information acquisition unit 241 and the information acquisition unit 231, and the difference between the measurement unit 243 and the measurement unit 233). Hence, overlapping descriptions are omitted here.

(2) Flow of Processing

Figure 14:
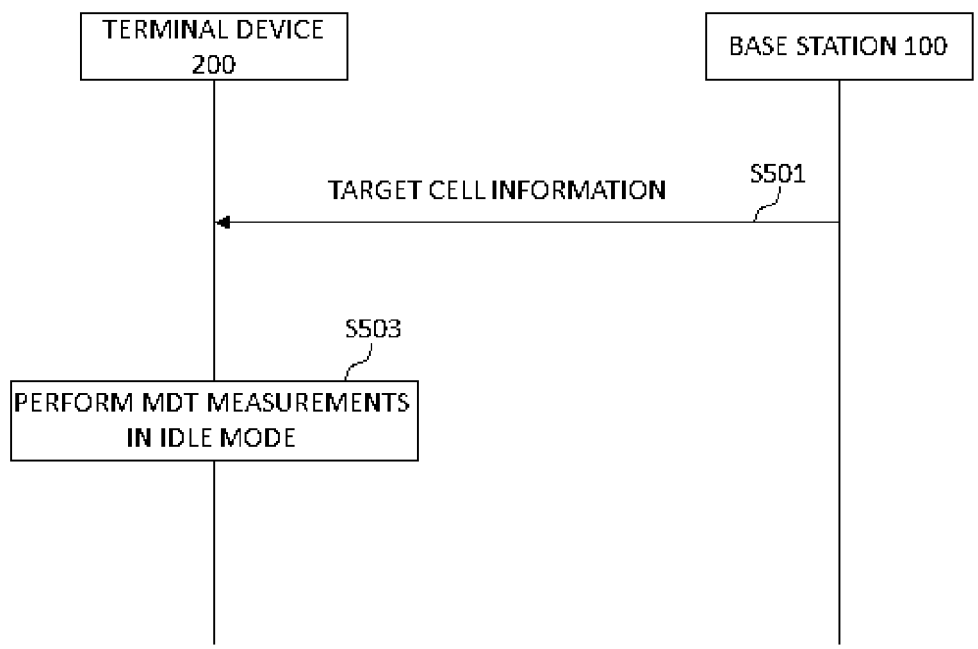
FIG. 14 is a sequence diagram illustrating an example of a schematic flow of processing by the base station and the terminal apparatus according to the second exemplary embodiment.
Figure 1:
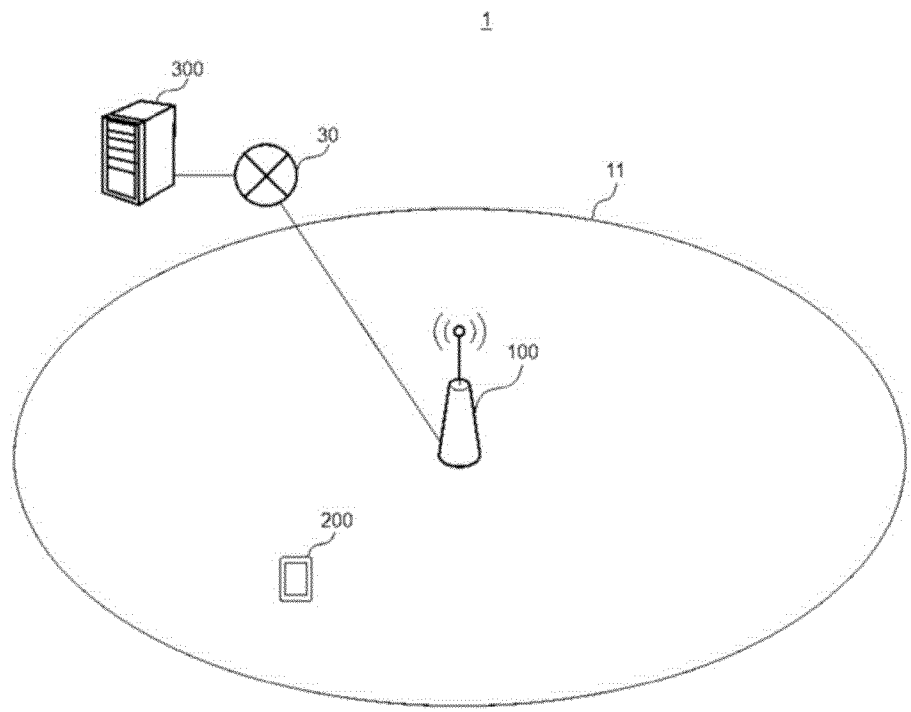
Figure 2:
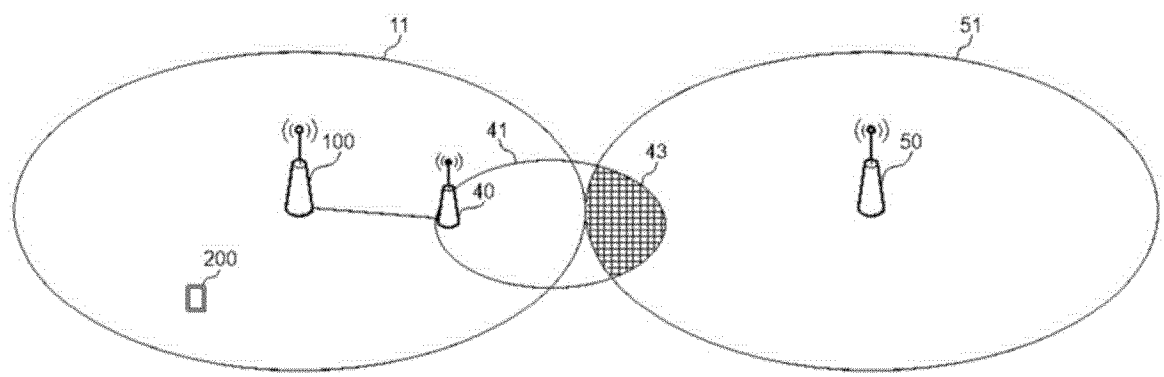

With reference to FIG. 14, an example of a flow of processing according to the second exemplary embodiment is described. FIG. 14 is a sequence diagram illustrating an example of a schematic flow of processing by the base station 100 and the terminal apparatus 200 according to the second exemplary embodiment.

The base station 100 acquires target cell information indicating a target cell of MDT measurements in the idle mode of the terminal apparatus 200 and transmits the target cell information to the terminal apparatus 200 (S501). The target cell includes a DL only cell.

The terminal apparatus 200 acquires the target cell information and performs the MDT measurements on the basis of the target cell information (S503).

The exemplary embodiments of the present invention have been described above. The present invention is not limited to the above-described exemplary embodiments and is possible to be implemented by making various changes within the scope of the gist of the present invention. The above-described exemplary embodiments are examples, and it should be understood by those skilled in the art that various modified examples can be made to combinations of the exemplary embodiments and combinations of constituent components and processing processes of the exemplary embodiments and that such modified examples are also within the scope of the present invention.

For example, although the descriptions have been given mainly on the basis of the examples in which a DL only cell is a small cell, the present invention is not limited to these examples. For example, the DL only cell may be a macro cell.

Moreover, for example, the expression that a "measurement value is better than a threshold" may be rephrased as a "measurement value is larger than a threshold", and the expression that a "measurement value is worse than a threshold" may be rephrased as a "measurement value is smaller than a threshold".

Moreover, for example, the steps in any processing described in the present description need not be performed chronologically in the order illustrated in the corresponding sequence diagram. For example, the steps of the processing may be performed in a different order from the order illustrated as the corresponding sequence diagram or may be performed in parallel.

Moreover, a base station apparatus (e.g., an apparatus including a base band unit (BBU) or a BBU) including constituent elements (e.g., the information acquisition unit and/or the communication processing unit) of any base station described herein, or a module of the base station apparatus (e.g., a BBU or a BBU module) may be provided.

A module including the constituent elements (e.g., the information acquisition unit, the measurement unit, and/or the report unit) of any terminal apparatus described herein may be provided. A module including the constituent elements (e.g., the information acquisition unit and/or the communication processing unit) of any network node described herein may be provided. A Method including processing by such constituent elements may be provided, and A program for causing processor(s) to execute the processing of such constituent elements may be provided. Recording medium storing the program may be provided. It is apparent that such a base station, modules, methods, programs, and recording medium are also included in the present invention.

Some of or all the above-described exemplary embodiments can be described as in the following Supplementary Notes, but are not limited to the following.

(Supplementary Note 1)

An apparatus comprising: an information acquisition unit configured to acquire target cell information indicating a target cell of Minimization of Drive Tests (MDT) measurements in an idle mode of a terminal apparatus; and a communication processing unit configured to transmit the target cell information to the terminal apparatus;

wherein the target cell includes a downlink only cell.

(Supplementary Note 2)

The apparatus according to Supplementary Note 1, wherein the target cell information is included in a configuration parameter for MDT in the idle mode, and the communication processing unit is configured to transmit a message including the configuration parameter to the terminal apparatus.

(Supplementary Note 3)

The apparatus according to Supplementary Note 2, wherein the message is a Logged Measurement Configuration message.

(Supplementary Note 4)

The apparatus according to any one of Supplementary Notes 1 to 3, wherein the information acquisition unit is configured to acquire initiation condition information relating to an initiation condition of the MDT measurements, and the communication processing unit is configured to transmit the initiation condition information to the terminal apparatus.

(Supplementary Note 5)

The apparatus according to Supplementary Note 4, wherein the initiation condition includes that a specific cell is selected in cell reselection, and the initiation condition information includes cell information indicating the specific cell.

(Supplementary Note 6)

The apparatus according to Supplementary Note 4, wherein the initiation condition includes that a measurement value of the downlink only cell is better than a threshold, and the initiation condition information includes threshold information indicating the threshold.

(Supplementary Note 7)

The apparatus according to any one of Supplementary Notes 1 to 6, wherein the information acquisition unit is configured to acquire termination condition information relating to a termination condition of the MDT measurements, and the communication processing unit is configured to transmit the termination condition information to the terminal apparatus.

(Supplementary Note 8)

The apparatus according to Supplementary Note 7, wherein the termination condition includes that a measurement value of the downlink only cell is worse than a threshold, and the termination condition information includes threshold information indicating the threshold.

(Supplementary Note 9)

The apparatus according to Supplementary Note 7, wherein the termination condition includes that a specific cell is selected in cell reselection, and the termination condition information includes cell information indicating the specific cell.

(Supplementary Note 10)

The apparatus according to any one of Supplementary Notes 7 to 9, wherein the termination condition includes that a measurement time period expires, and the termination condition information includes time period information indicating the measurement time period.

(Supplementary Note 11)

The apparatus according to Supplementary Note 5 or 8, wherein the apparatus is a base station, a base station apparatus for the base station, or a module for the base station apparatus, and the downlink only cell is a cell of the base station.

(Supplementary Note 12)

The apparatus according to Supplementary Note 6 or 9, wherein the apparatus is a base station, a base station apparatus for the base station, or a module for the base station apparatus, and the downlink only cell is a cell of another base station different from the base station.

(Supplementary Note 13)

An apparatus comprising:

an information acquisition unit configured to acquire target cell information indicating a target cell of MDT measurements in an idle mode of a terminal apparatus, the target cell information being transmitted by a base station; and a measurement unit configured to perform the MDT measurements based on the target cell information;

wherein the target cell includes a downlink only cell.

(Supplementary Note 14)

The apparatus according to Supplementary Note 13, wherein the information acquisition unit is configured to acquire initiation condition information relating to an initiation condition of the MDT measurements, the initiation condition information being transmitted by the base station, and the measurement unit is configured to initiate the MDT measurements based on the initiation condition information.

(Supplementary Note 15)

The apparatus according to Supplementary Note 13 or 14, wherein the information acquisition unit is configured to acquire termination condition information relating to a termination condition of the MDT measurements, the termination condition information being transmitted by the base station, and the measurement unit is configured to terminate the MDT measurements based on the termination condition information.

(Supplementary Note 16)

An apparatus comprising:

an information acquisition unit configured to acquire target cell information indicating a target cell of MDT measurements in an idle mode of a terminal apparatus; and a communication processing unit configured to transmit the target cell information to a base station;

wherein the target cell includes a downlink only cell.

(Supplementary Note 17)

The apparatus according to any one of Supplementary Notes 1 to 16, wherein the MDT measurements are Logged MDT measurements.

(Supplementary Note 18)

The apparatus according to any one of Supplementary Notes 1 to 17, wherein the target cell information includes a cell ID of the downlink only cell, band information indicating a frequency band of the downlink only cell, or frequency information indicating a frequency of the downlink only cell.

(Supplementary Note 19)

The apparatus according to any one of Supplementary Notes 1 to 18, wherein the downlink only cell is a cell in a downlink-dedicated band.

(Supplementary Note 20)

The apparatus according to Supplementary Note 19, wherein the downlink-dedicated band is Band 29 or Band 32.

(Supplementary Note 21)

A method including:

acquiring target cell information indicating a target cell of MDT measurements in an idle mode of a terminal apparatus; and transmitting the target cell information to the terminal apparatus;

wherein the target cell includes a downlink only cell.

(Supplementary Note 22)

A method including:

acquiring target cell information indicating a target cell of MDT measurements in an idle mode of a terminal apparatus, the target cell information being transmitted by a base station; and performing the MDT measurements based on the target cell information;

wherein the target cell includes a downlink only cell.

(Supplementary Note 23)

A method including:

acquiring target cell information indicating a target cell of MDT measurements in an idle mode of a terminal apparatus; and transmitting the target cell information to a base station;

wherein the target cell includes a downlink only cell.

(Supplementary Note 24)

A system including:

a base station configured to transmit, to a terminal apparatus, target cell information indicating a target cell of MDT measurements in an idle mode of the terminal apparatus; and the terminal apparatus configured to perform the MDT measurements based on the target cell information;

wherein the target cell includes a downlink only cell.

(Supplementary Note 25)

A method including:

transmitting, by a base station to a terminal apparatus, target cell information indicating a target cell of MDT measurements in an idle mode of the terminal apparatus; and performing, by the terminal apparatus, the MDT measurements based on the target cell information;
wherein the target cell includes a downlink only cell.

(Supplementary Note 26)

A program causing a processor to execute:

acquiring target cell information indicating a target cell of MDT measurements in an idle mode of a terminal apparatus; and transmitting the target cell information to the terminal apparatus, wherein the target cell includes a downlink only cell.

(Supplementary Note 27)

A readable recording medium storing a program causing a processor to execute:

acquiring target cell information indicating a target cell of MDT measurements in an idle mode of a terminal apparatus; and transmitting the target cell information to the terminal apparatus, wherein the target cell includes a downlink only cell.

(Supplementary Note 28)

A program causing a processor to execute:

acquiring target cell information indicating a target cell of MDT measurements in an idle mode of a terminal apparatus, the target cell information being transmitted by a base station; and performing the MDT measurements based on the target cell information, wherein the target cell includes a downlink only cell.

(Supplementary Note 29)

A readable recording medium storing a program causing a processor to execute:

acquiring target cell information indicating a target cell of MDT measurements in an idle mode of a terminal apparatus, the target cell information being transmitted by a base station; and performing the MDT measurements based on the target cell information, wherein the target cell includes a downlink only cell.

(Supplementary Note 30)

A program causing a processor to execute:

acquiring target cell information indicating a target cell of MDT measurements in an idle mode of a terminal apparatus; and transmitting the target cell information to a base station, wherein the target cell includes a downlink only cell.

(Supplementary Note 31)

A readable recording medium storing a program causing a processor to execute:

acquiring target cell information indicating a target cell of MDT measurements in an idle mode of a terminal apparatus; and transmitting the target cell information to a base station.

wherein the target cell includes a downlink only cell.

(Supplementary Note 32)

The apparatus according to any one of Supplementary Notes 1 to 12, wherein the apparatus is a base station, a base station apparatus for a base station, or a module for the base station apparatus.

(Supplementary Note 33)

The apparatus according to any one of Supplementary Notes 13 to 15, wherein the apparatus is the terminal apparatus, or a module for the terminal apparatus.

(Supplementary Note 34)

The apparatus according to Supplementary Notes 16, wherein the apparatus is a core network node, or a module for a core network node.

REFERENCE SIGNS LIST

1 System
30 Network
11, 41, 51, 61, 71 (Cell) coverage
40, 70 Remote unit
43, 73 Area (unavailable coverage/unnecessary coverage)
100 Base station
141, 151 Information acquisition unit
143, 153 Communication processing unit
200 Terminal apparatus
231, 241 Information acquisition unit
233, 243 Measurement unit
235 Report unit
300 Network node
331 Information acquisition unit
333 Communication processing unit

What is claimed is:

1. An apparatus comprising:
a memory storing instructions; and
one or more processors configured to execute the instructions to:
acquire target cell information indicating a target cell of Minimization of Drive Tests (MDT) measurements in an idle mode of a terminal apparatus, and
transmit the target cell information to the terminal apparatus,
wherein the target cell includes a downlink only cell which is used for downlink communication in a user plane and is not used for communication in a control plane, and
wherein the downlink only cell is used as a secondary cell of carrier aggregation but is not used as a primary cell of carrier aggregation.

2. The apparatus according to claim 1, wherein
the target cell information is included in a configuration parameter for MDT in the idle mode, and
the one or more processors are further configured to execute the instructions to transmit a message including the configuration parameter to the terminal apparatus.

3. The apparatus according to claim 2, wherein the message is a Logged Measurement Configuration message.

4. The apparatus according to claim 1, wherein the one or more processors are further configured to execute the instructions to:
acquire initiation condition information relating to an initiation condition of the MDT measurements, and
transmit the initiation condition information to the terminal apparatus.

5. The apparatus according to claim 4, wherein
the initiation condition includes that a specific cell is selected in cell reselection, and
the initiation condition information includes cell information indicating the specific cell.

6. The apparatus according to claim 4, wherein
the initiation condition includes that a measurement value of the downlink only cell is better than a threshold, and
the initiation condition information includes threshold information indicating the threshold.

7. The apparatus according to claim 1, wherein the one or more processors are further configured to execute the instructions to:
acquire termination condition information relating to a termination condition of the MDT measurements, and
transmit the termination condition information to the terminal apparatus.

8. The apparatus according to claim 7, wherein
the termination condition includes that a measurement value of the downlink only cell is worse than a threshold, and
the termination condition information includes threshold information indicating the threshold.

9. The apparatus according to claim 7, wherein
the termination condition includes that a specific cell is selected in cell reselection, and
the termination condition information includes cell information indicating the specific cell.

10. The apparatus according to claim 7, wherein
the termination condition includes that a measurement time period expires, and
the termination condition information includes time period information indicating the measurement time period.

11. The apparatus according to claim 5, wherein
the apparatus is a base station, a base station apparatus for the base station, or a module for the base station apparatus, and
the downlink only cell is a cell of the base station.

12. The apparatus according to claim 6, wherein
the apparatus is a base station, a base station apparatus for the base station, or a module for the base station apparatus, and
the downlink only cell is a cell of another base station different from the base station.

13. The apparatus according to claim 1, wherein the MDT measurements are Logged MDT measurements.

14. The apparatus according to claim 1, wherein the target cell information includes a cell ID of the downlink only cell, band information indicating a frequency band of the downlink only cell, or frequency information indicating a frequency of the downlink only cell.

15. The apparatus according to claim 1, wherein the downlink only cell is a cell in a downlink-dedicated band.

16. The apparatus according to claim 1, wherein the apparatus is a base station, a base station apparatus for a base station, or a module for the base station apparatus.

17. An apparatus comprising:
a memory storing instructions; and
one or more processors configured to execute the instructions to:
acquire target cell information indicating a target cell of Minimization of Drive Tests (MDT) measurements in an idle mode of a terminal apparatus, the target cell information being transmitted by a base station, and the target cell including a downlink only cell which is used for downlink communication in a user plane and is not used for communication in a control plane and which is used as a secondary cell of carrier aggregation but is not used as a primary cell of carrier aggregation; and
perform the MDT measurements on the downlink only cell that the target cell information indicates.

18. The apparatus according to claim 17, wherein the one or more processors are further configured to execute the instructions to:
acquire initiation condition information relating to an initiation condition of the MDT measurements, the initiation condition information being transmitted by the base station, and
initiate the MDT measurements based on the initiation condition information.

19. The apparatus according to claim 17, wherein the one or more processors are further configured to execute the instructions to:
acquire termination condition information relating to a termination condition of the MDT measurements, the termination condition information being transmitted by the base station, and
terminate the MDT measurements based on the termination condition information.

20. A method comprising:
acquiring target cell information indicating a target cell of Minimization of Drive Tests (MDT) measurements in an idle mode of a terminal apparatus; and
transmitting the target cell information to the terminal apparatus,
wherein the target cell includes a downlink only cell which is used for downlink communication in a user plane and is not used for communication in a control plane, and
wherein the downlink only cell is used as a secondary cell of carrier aggregation but is not used as a primary cell of carrier aggregation.

* * * * *

UNITED STATES PATENT AND TRADEMARK OFFICE
CERTIFICATE OF CORRECTION

PATENT NO. : 10,880,768 B2
APPLICATION NO. : 15/752028
DATED : December 29, 2020
INVENTOR(S) : Takahiro Tsutsui It is certified that error appears in the above-identified patent and that said Letters Patent is hereby corrected as shown below:

In the Drawings

Please replace FIGS. 1-2 with FIGS. 1-2 as shown on the attached page.

Signed and Sealed this
Sixth Day of April, 2021

Drew Hirshfeld
*Performing the Functions and Duties of the
Under Secretary of Commerce for Intellectual Property and
Director of the United States Patent and Trademark Office*